US012224531B2

(12) United States Patent
Kim et al.

(10) Patent No.: US 12,224,531 B2
(45) Date of Patent: Feb. 11, 2025

(54) BOARD CONNECTOR

(71) Applicant: LS MTRON LTD., Anyang-si (KR)

(72) Inventors: Dong Wan Kim, Anyang-si (KR); Hyun Joo Hwang, Anyang-si (KR); In Duk Song, Anyang-si (KR); Sang Jun Oh, Anyang-si (KR); Seok Lee, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 285 days.

(21) Appl. No.: 17/799,523

(22) PCT Filed: Feb. 5, 2021

(86) PCT No.: PCT/KR2021/001540

§ 371 (c)(1),
(2) Date: Aug. 12, 2022

(87) PCT Pub. No.: WO2021/162357

PCT Pub. Date: Aug. 19, 2021

(65) Prior Publication Data

US 2023/0056967 A1 Feb. 23, 2023

(30) Foreign Application Priority Data

Feb. 14, 2020 (KR) ........................ 10-2020-0018067
Mar. 10, 2020 (KR) ........................ 10-2020-0029683

(Continued)

(51) Int. Cl.
*H01R 13/6581* (2011.01)
*H01R 12/71* (2011.01)

(52) U.S. Cl.
CPC ....... *H01R 13/6581* (2013.01); *H01R 12/716* (2013.01)

(58) Field of Classification Search
CPC .. H01R 23/725; H01R 9/096; H01R 13/6594; H01R 13/6581; H01R 12/52; H01R 12/716

(Continued)

(56) References Cited

U.S. PATENT DOCUMENTS 7,585,185 B2 * 9/2009 Obikane ............ H01R 13/6581 439/74
9,484,648 B2 11/2016 Takenaga (Continued)

FOREIGN PATENT DOCUMENTS

JP 2017050235 A 3/2017
JP 2018110087 A 7/2018

(Continued)

OTHER PUBLICATIONS

Office Action for related Japanese Application No. 2022-556056; action dated Sep. 29, 2023; (3 pages).

(Continued)

*Primary Examiner* — Gary F Paumen
(74) *Attorney, Agent, or Firm* — K&L Gates LLP

(57) ABSTRACT

The present disclosure pertains to a board connector comprising a plurality of radio frequency (RF) contacts for transmitting RF signals; an insulating part supporting the RF contacts; a plurality of transmission contacts coupled to the insulating part and between a first RF contact and a second RF contact, such that the first RF contact and the second RF contact are spaced in a first axial direction; and a grounding housing to which the insulating part is coupled, the grounding housing comprising an inner grounding wall, an outer grounding wall spaced apart from the inner grounding wall, and a grounding connection wall coupled to each of the inner and outer grounding walls, wherein the inner and outer grounding walls are double-shielding walls that surround the (Continued)

side of an inner space, and the first RF contact and the second RF contact are placed in the inner space surrounded by the double-shielding walls.

20 Claims, 27 Drawing Sheets

(30) Foreign Application Priority Data

Mar. 19, 2020 (KR) ........................ 10-2020-0033572
Jan. 22, 2021 (KR) ........................ 10-2021-0009085

(58) Field of Classification Search
USPC ................................. 439/74, 607.35, 607.36
See application file for complete search history.

(56) References Cited

U.S. PATENT DOCUMENTS 10,446,985 B2 10/2019 Ooi
10,615,545 B2 4/2020 Jin
10,847,917 B2 11/2020 Ishida
11,075,475 B2 7/2021 Chen
11,095,059 B2 8/2021 Gondo
11,146,004 B2 10/2021 Yamaguchi
11,152,727 B2 10/2021 Kobayashi
11,411,333 B2 8/2022 Someya
11,424,565 B2 8/2022 Someya
11,495,903 B2 11/2022 Oosaka
11,563,284 B2 1/2023 Oosaka
11,605,911 B2 3/2023 Yamada
11,837,811 B2 12/2023 Sugaya
11,888,268 B2 1/2024 Mamuro
2005/0101163 A1* 5/2005 Obikane ............ H01R 13/6471 439/74
2008/0045076 A1 2/2008 Dittmann
2013/0005192 A1 1/2013 Lim
2013/0012039 A1* 1/2013 Nose ...................... H01R 12/73 439/74
2013/0059471 A1 3/2013 Mongold
2015/0140840 A1* 5/2015 Nishimura ........... H01R 12/775 439/74
2015/0140841 A1 5/2015 Watanabe
2016/0240944 A1 8/2016 Kodaira
2017/0005423 A1 1/2017 Takenaga
2018/0183189 A1 6/2018 Chuang
2018/0198241 A1 7/2018 Ooi
2019/0214772 A1 7/2019 Kodama
2020/0044374 A1 2/2020 Ishida
2021/0006017 A1* 1/2021 Chen .................. H01R 13/6586
2021/0359471 A1 11/2021 Oosaka
2022/0094112 A1 3/2022 Kim
2023/0104947 A1 4/2023 Oh
2023/0144353 A1 5/2023 Oh

FOREIGN PATENT DOCUMENTS

JP WO2018025873 A1 6/2019
JP 2019197719 A 11/2019
JP 2019530164 A 11/2019
JP WO2020040004 A1 8/2020
JP 2021111598 A 8/2021
KR 20010007060 A 1/2001
KR 20100043273 A 4/2010
KR 20170015125 A 2/2017
KR 20170036529 A 4/2017
KR 20170129066 A 11/2017
KR 20180081441 A 7/2018
KR 20200008840 A 1/2020
WO 2017196100 A1 11/2017

OTHER PUBLICATIONS

International Search Report for related International Application No. PCT/KR2021/001540; action dated Aug. 19, 2021; (6 pages).
Written Opinion for related International Application No. PCT/KR2021/001540; action dated Aug. 19, 2021; (8 pages).
Office Action for Korean Application No. 10-2021-0029518; action dated Jan. 24, 2024; (7 pages).
International Search Report for related International Application No. PCT/KR2021/002843; report dated Sep. 23, 2021; (5 pages).
Written Opinion for related International Application No. PCT/KR2021/002843; report dated Sep. 23, 2021; (5 pages).
Non-Final Office Action for related U.S. Appl. No. 17/912,585; action dated Nov. 12, 2024; (7 pages).

* cited by examiner

BOARD CONNECTOR

CROSS-REFERENCE TO RELATED APPLICATION

The present application is a National Stage of International Application No. PCT/KR2021/001540 filed on Feb. 5, 2021, which claims priority to and the benefit of Korean Utility Model Application No. 10-2020-0018067, filed on Feb. 14, 2020; Korean Utility Model Application No. 10-2020-0029683, filed Mar. 10, 2020; Korean Utility Model Application No. 10-2020-0033572, filed Mar. 19, 2020; and Korean Utility Model Application No. 10-2021-0009085, filed Jan. 22, 2021 the disclosures of which are incorporated herein by reference in their entirety.

FIELD

The present disclosure relates to a board connector installed in an electronic device for electrical connection between boards.

BACKGROUND

Connectors are provided for various electronic devices for electrical connection. For example, the connectors may be installed in an electronic device such as a mobile phone, a computer, a tablet computer, and the like to electrically connect various components installed in the electronic device.

In general, a radio frequency (RF) connector and a board-to-board connector (hereinafter referred to as a "board connector") are provided inside a wireless communication device such as a smart phone or a tablet PC among electronic devices. An RF connector delivers RF signals. The board connector processes digital signals of cameras or the like.

The RF connector and the board connector are mounted on a printed circuit board (PCB). Conventionally, several board connectors and RF connectors are mounted together with a large number of components in a limited PCB space, and thus there is a problem in that the PCB mounting area becomes larger. Accordingly, following the trend of miniaturization of smartphones, there is a need for a technology that integrates an RF connector and a board connector and optimizes the connectors within a small PCB mounting area.

FIG. 1 is a schematic perspective view of a board connector according to the related art.

Referring to FIG. 1, a board connector 100 according to the related art includes a first connector 110 and a second connector 120.

The first connector 110 is to be coupled to a first board (not shown). The first connector 110 may be electrically connected to the second connector 120 through a plurality of first contacts 111.

The second connector 120 is to be coupled to a second board (not shown). The second connector 120 may be electrically connected to the first connector 110 through a plurality of second contacts 121.

The board connector 100 according to the related art may electrically connect the first board and the second board as the first contacts 111 and the second contacts 121 are interconnected. Also, when some contacts among the first contacts 111 and the second contacts 121 are used as RF contacts for transmitting RF signals, the board connector 100 according to the related art may be implemented such that RF signals are transmitted between the first board and the second board through the RF contacts.

Here, the board connector 100 according to the related art has the following problems.

First, the board connector 100 according to the related art cannot achieve smooth signal transmission due to RF signal inference between the RF contacts 111', 111", 121', and 121" when relatively closely spaced contacts among the contacts 111 and 121 are used as the RF contacts.

Second, the board connector 100 according to the related art has an RF signal shielding unit 112 on the outermost part of the connector and thus can shield the radiation of RF signals to the outside but cannot achieve shielding between RF signals.

Third, the board connector 100 according to the related art includes RF contacts 111', 111", 121', and 121" including mounting parts 111*a*', 111*a*", 121*a*', and 121*a*" mounted on a board, and the mounting parts 111*a*', 111*a*", 121*a*', and 121*a*" are exposed to the outside. Accordingly, the board connector 100 according to the related art cannot shield the mounting parts 111*a*', 111*a*", 121*a*', and 121*a*".

SUMMARY

The present disclosure has been devised to solve the above problems and is directed to providing a board connector capable of reducing the possibility of RF signal interference between RF contacts.

In order to solve the above problems, the present disclosure may include the following configuration.

A board connector according to the present disclosure may include a plurality of radio frequency (RF) contacts for transmitting RF signals; an insulating part that supports the RF contacts; a plurality of transmission contacts coupled to the insulating part and between a first RF contact and a second RF contact, among the RF contacts, such that the first RF contact and the second RF contact are spaced apart from each other in a first axial direction; and a grounding housing to which the insulating part is coupled. The grounding housing may include an inner grounding wall facing the insulating part, an outer grounding wall spaced apart from the inner grounding wall, and a grounding connection wall coupled to each of the inner grounding wall and the outer grounding wall. The inner grounding wall and the outer grounding wall are double-shielding walls that surround the side of an inner space. The first RF contact and the second RF contact may be placed in the inner space surrounded by the double-shielding walls.

A board connector according to the present disclosure may include a plurality of radio frequency (RF) contacts for transmitting RF signals; an insulating part that supports the RF contacts; a plurality of transmission contacts coupled to the insulating part and between a first RF contact and a second RF contact, among the RF contacts, such that the first RF contact and the second RF contact are spaced apart from each other in a first axial direction; and a grounding housing to which the insulating part is coupled. The grounding housing may include an inner grounding wall surrounding the side of an inner space, an upper grounding wall protruding from the top of the side grounding wall to the inner space, and a lower grounding wall protruding from the bottom of the side grounding wall to the opposite side to the inner space. The first RF contact and the second RF contact may be placed in an inner space surrounded by the side grounding wall, the upper grounding wall, and the lower grounding wall.

According to the present disclosure, the following effects can be achieved.

The present disclosure can implement a shielding function of signals, electromagnetic waves, etc. for RF contacts by using a grounding housing. Thus, the present disclosure can prevent electromagnetic waves generated from RF contacts from interfering with signals of circuit components placed in the vicinity of an electronic device and can prevent electromagnetic waves generated from circuit components placed in the vicinity of an electronic device from interfering with RF signals transmitted by RF contacts. Accordingly, the present disclosure can contribute to improving electromagnetic interference (EMI) shielding performance and electromagnetic compatibility (EMC) performance by using the grounding housing.

The present disclosure may be implemented such that all RF contacts including portions mounted on a board are placed on the inner side of the grounding housing. Accordingly, the present disclosure can realize complete shielding by reinforcing a shielding function for RF contacts by using the grounding housing.

DETAILED DESCRIPTION

Hereinafter, embodiments of a board connector according to the present disclosure will be described in detail with reference to the accompanying drawings.

Figure 1:
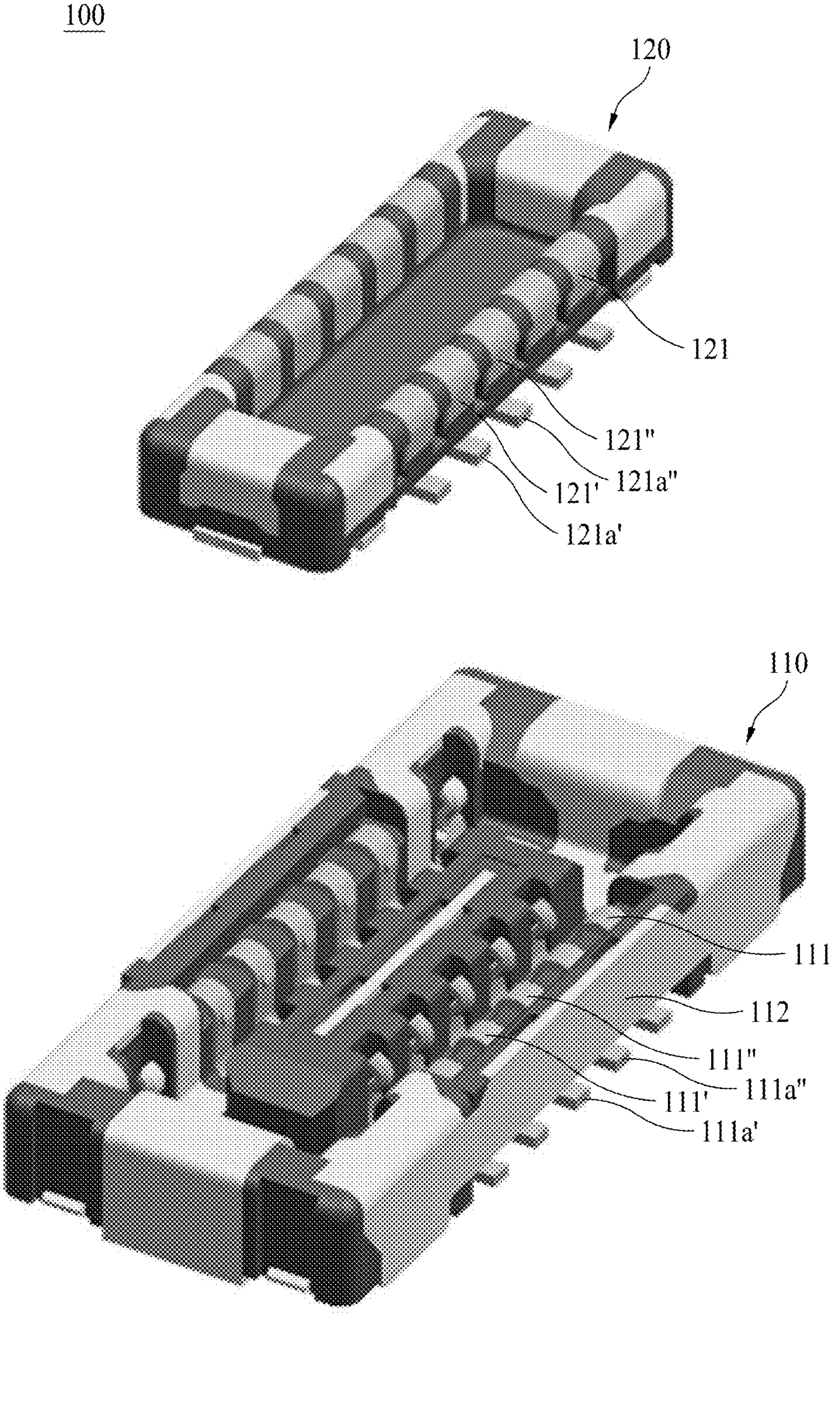
FIG. 1 is a schematic perspective view of a board connector according to the related art.
Figure 2:
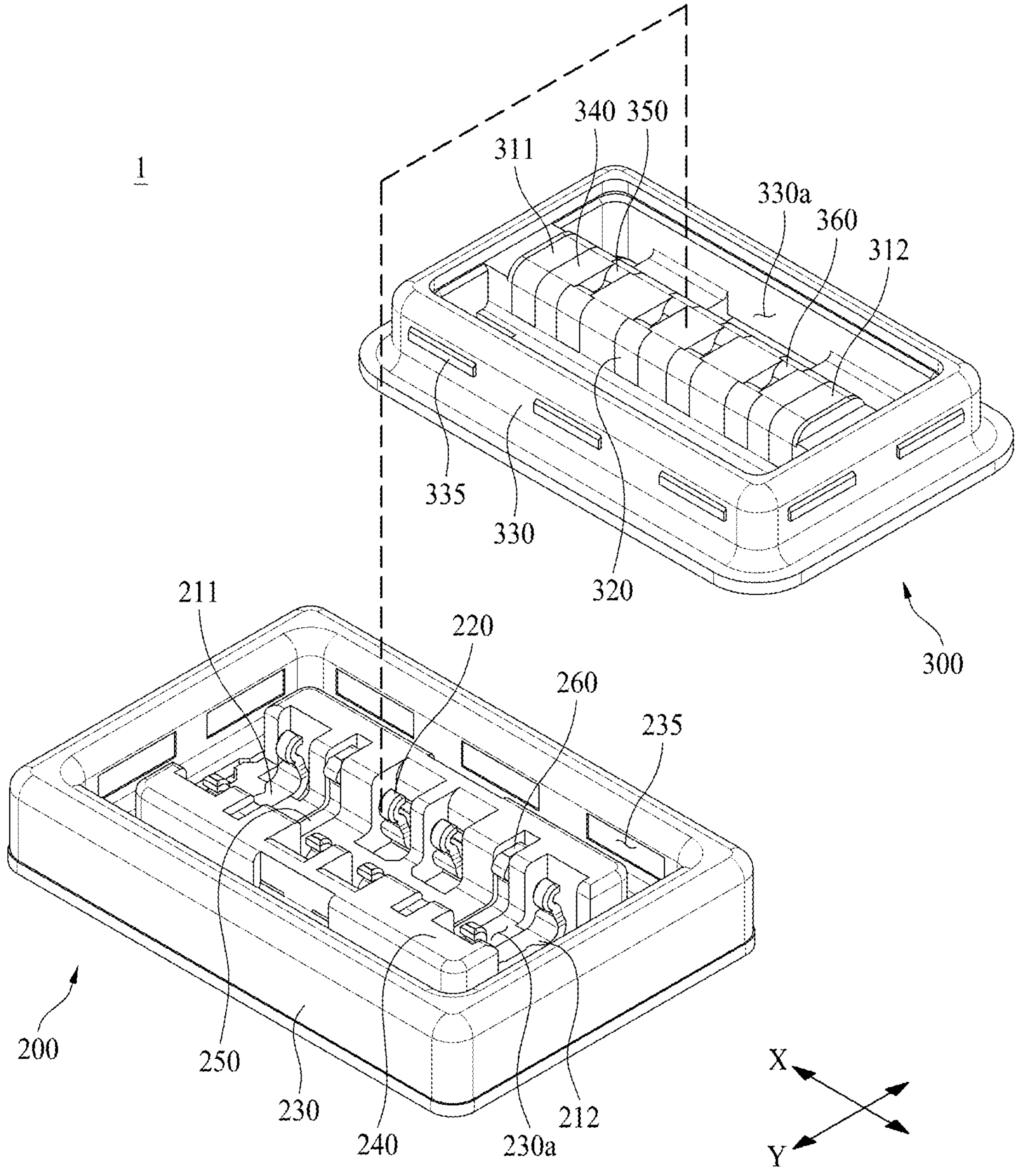
FIG. 2 is a schematic perspective view of a receptacle connector and a plug connector in a board connector according to the present disclosure.

Referring to FIG. 2, a board connector 1 according to the present disclosure may be installed in an electronic device (not shown) such as a mobile phone, a computer, and a tablet computer. The board connector 1 according to the present disclosure may be used to electrically connect a plurality of boards (not shown). The boards may be printed circuit boards (PCBs). For example, when a first board and a second board are electrically connected, a receptacle connector mounted on the first board and a plug connector mounted on the second board may be connected to each other. Thus, the first board and the second board may be electrically connected to each other through the receptacle connector and the plug connector.

The board connector 1 according to the present disclosure may be implemented as the receptacle connector. The board connector 1 according to the present disclosure may be implemented as the plug connector. The board connector 1 according to the present disclosure may be implemented to include both the receptacle connector and the plug connector. Hereinafter, an embodiment in which the board connector 1 according to the present disclosure is implemented as the receptacle connector is defined as a board connector 200 according to a first embodiment, and an embodiment in which the board connector 1 according to the present disclosure is implemented as the plug connector is defined as a board connector 300 according to a second embodiment, which will be described in detail with reference to the accompanying drawings. It will be apparent to those skilled in the art to derive an embodiment in which the board connector 1 according to the present disclosure includes both the receptacle connector and the plug connector.

Board Connector 200 According to First Embodiment

Figure 3:
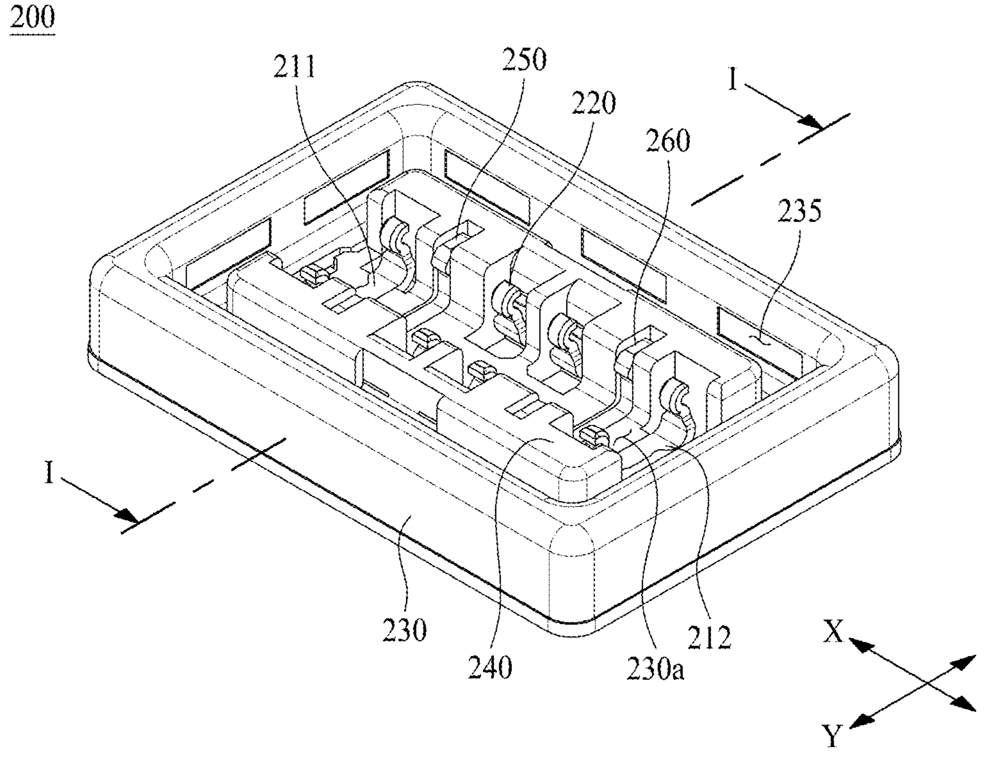
FIG. 3 is a schematic perspective view of a board connector according to a first embodiment.
Figure 4:
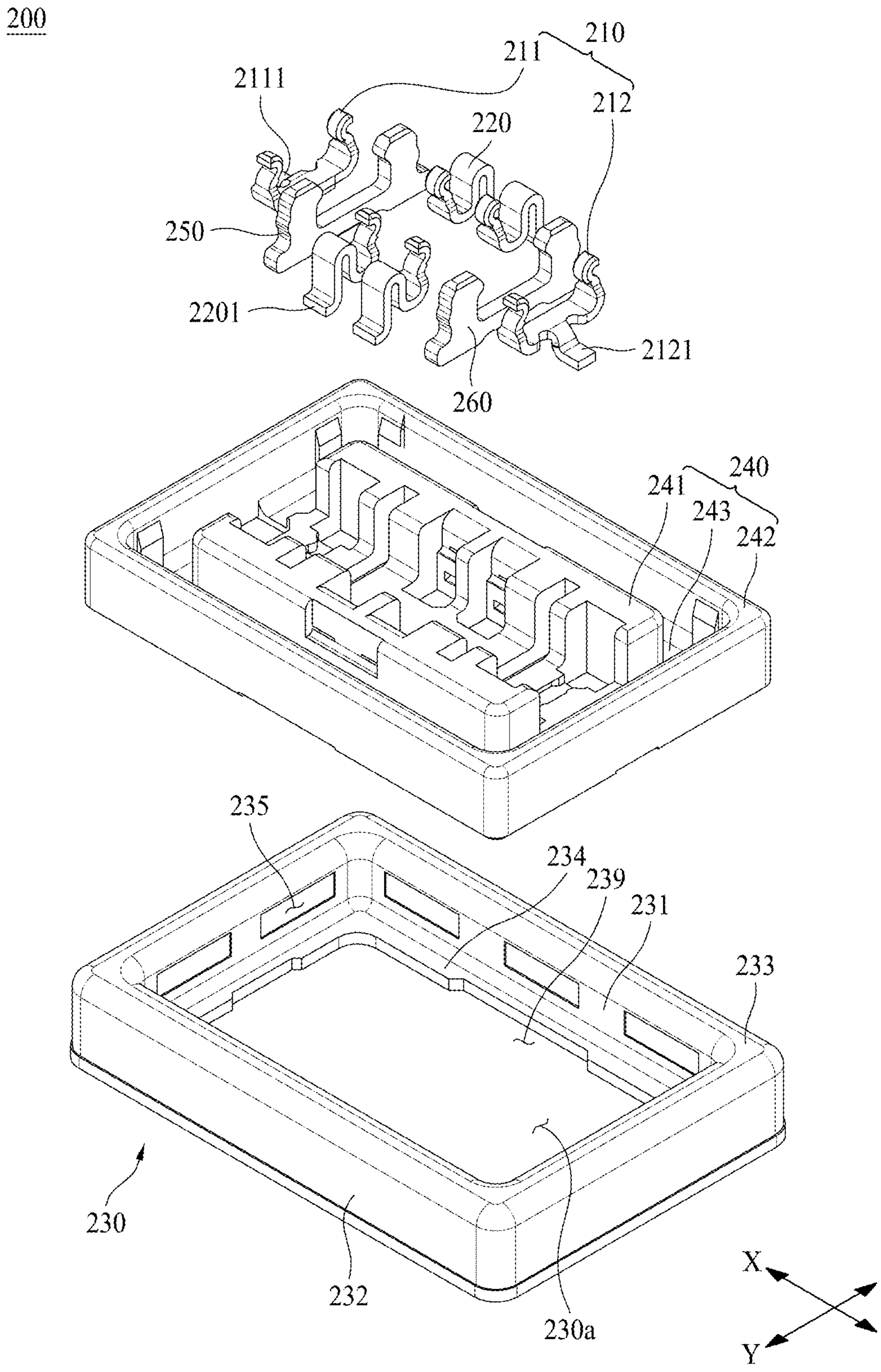
FIG. 4 is a schematic exploded perspective view of the board connector according to the first embodiment.

Referring to FIGS. 2 to 4, the board connector 200 according to the first embodiment may include a plurality of RF contacts 210, a plurality of transmission contacts 220, a grounding housing 230, and an insulating part 240.

The RF contacts 210 are for transmitting radio frequency (RF) signals. The RF contacts 210 may transmit ultra-high frequency RF signals. The RF contacts 210 may be supported by the insulating part 240. The RF contacts 210 may be coupled to the insulating part 240 through an assembly process. The RF contacts 210 may be integrally molded with the insulating part 240 through injection molding.

The RF contacts 210 may be spaced apart from one another. The RF contacts 210 may be electrically connected to the first board by being mounted on the first board. The RF contacts 210 may be electrically connected to the second board on which the plug connector is mounted, by being connected to the RF contacts of the plug connector. Thus, the first board and the second board may be electrically connected to each other.

A first RF contact 211 among the RF contacts 210 and a second RF contact 212 among the RF contacts 210 may be spaced apart from each other in a first axial direction (x-axis direction). The first RF contact 211 and the second RF contact 212 may be supported by the insulating part 240 at positions spaced apart from each other in the first axial direction (x-axis direction). In FIG. 4, it is shown that the board connector 200 according to the first embodiment includes two RF contacts 210. However, the present disclosure is not limited thereto, and the board connector 200 according to the first embodiment may include three or more RF contacts 210. Meanwhile, the board connector 200 according to the first embodiment will be described herein as including two RF contacts 210.

The first RF contact 211 may include a first RF mounting member 2111. The first RF mounting member 2111 may be mounted on the first board. Thus, the first RF contact 211 may be electrically connected to the first board through the first RF mounting member 2111. The first RF contact 211 may be formed of an electrically conductive material. For example, the first RF contact 211 may be formed of metal. The first RF contact 211 may be connected to one of the RF contacts of the plug connector.

The second RF contact 212 may include a second RF mounting member 2121. The second RF mounting member 2121 may be mounted on the first board. Thus, the second RF contact 212 may be electrically connected to the first board through the second RF mounting member 2121. The second RF contact 212 may be formed of an electrically conductive material. For example, the second RF contact 212 may be formed of metal. The second RF contact 212 may be connected to one of the RF contacts of the plug connector.

Referring to FIGS. 2 to 4, the transmission contacts 220 may be coupled to the insulating part 240. The transmission contacts 220 may be in charge of transmitting signals, data, etc. The transmission contacts 220 may be coupled to the insulating part 240 through an assembly process. The transmission contacts 220 may be integrally molded with the insulating part 240 through injection molding.

The transmission contacts 220 may be disposed between the first RF contact 211 and the second RF contact 212 in the first axial direction (x-axis direction). Thus, in order to reduce RF signal interference between the first RF contact 211 and the second RF contact 212, the transmission contacts 220 may be disposed in a space between the first RF contact 211 and the second RF contact 212. Accordingly, the board connector 200 according to the first embodiment can reduce RF signal interference by increasing the spacing between the first RF contact 211 and the second RF contact 212 and also can improve the space utilization of the insulating part 240 by arranging the transmission contacts 220 in the space.

The transmission contacts 220 may be spaced apart from each other. The transmission contacts 220 may be electrically connected to the first board by being mounted on the first board. In this case, a transmission mounting member 2201 of each of the transmission contacts 220 may be mounted on the first board. The transmission contacts 220 may be formed of an electrically conductive material. For example, the transmission contacts 220 may be formed of metal. The transmission contacts 220 may be electrically connected to the second board on which the plug connector is mounted, by being connected to transmission contacts of the plug connector. Thus, the first board and the second board may be electrically connected to each other.

Meanwhile, FIG. 4 shows that the board connector 200 according to the first embodiment includes four transmission contacts 220. However, the present disclosure is not limited thereto, and the board connector 200 according to the first embodiment may include five or more transmission contacts 220. The transmission contacts 220 may be spaced apart from each other in the first axial direction (x-axis direction) and a second axial direction (y-axis direction). The first axial direction (x-axis direction) and the second axial direction (y-axis direction) are perpendicular to each other.

Referring to FIGS. 2 to 6, the insulating part 240 is coupled to the grounding housing 230. The grounding housing 230 may be grounded by being mounted on the first board. Thus, the grounding housing 230 may implement a shielding function of signals, electromagnetic waves, etc. for the RF contacts 210. In this case, the grounding housing 230 can prevent electromagnetic waves generated from the RF contacts 210 from interfering with signals of circuit components placed in the vicinity of the electronic device and can prevent electromagnetic waves generated from circuit components placed in the vicinity of the electronic device from interfering with RF signals transmitted by the RF contacts 210. Thus, the board connector 200 according to the first embodiment can contribute to improving EMI shielding performance and EMC performance by using the grounding housing 230. The grounding housing 230 may be formed of an electrically conductive material. For example, the grounding housing 230 may be formed of metal.

The grounding housing 230 may be disposed to surround the lateral sides of an inner space 230*a*. A portion of the insulating part 240 may be placed in the inner space 230*a*. The first RF contact 211, the second RF contact 212, and the transmission contacts 220 may all be placed in the inner space 230*a*. In this case, the first RF mounting member 2111, the second RF mounting member 2121, and the transmission mounting members 2201 may all be placed in the inner space 230*a*. Accordingly, by implementing shielding walls for the first RF contact 211 and the second RF contact 212, the grounding housing 230 can strengthen the shielding function for the first RF contact 211 and the second RF contact 212 to realize complete shielding. The plug connector may be inserted into the inner space 230*a*.

The grounding housing 230 may be disposed to surround all the sides of the inner space 230*a*. The inner space 230*a* may be disposed on an inner side of the grounding housing 230. When the grounding housing 230 is formed in a rectangular ring shape as a whole, the inner space 230*a* may be formed in a rectangular parallelepiped shape. In this case, the grounding housing 230 may be disposed to surround four sides of the inner space 230*a*.

Referring to FIGS. 2 to 7, the grounding housing 230 may be implemented to have double-shielding walls. To this end, the grounding housing 230 may include an inner grounding wall 231, an outer grounding wall 232, and a grounding connection wall 233.

The inner grounding wall 231 may be toward the insulating part 240. The inner grounding wall 231 may be disposed toward the inner space 230*a*. The inner grounding wall 231 may be disposed to surround all the sides of the inner space 230*a*. When the plug connector is inserted into the inner space 230*a*, the inner grounding wall 231 may be connected to the grounding housing of the plug connector.

The outer grounding wall 232 may be spaced apart from the inner grounding wall 231. The outer grounding wall 232 may be disposed outside the inner grounding wall 231. The outer grounding wall 232 may be disposed to surround all the sides of the inner grounding wall 231.

The outer grounding wall 232 and the inner grounding wall 231 may be implemented as double-shielding walls that surround the side of the inner space 230*a*. The first RF contact 211 and the second RF contact 212 may be placed in the inner space 230*a* surrounded by the double-shielding walls. Thus, the grounding housing 230 can strengthen the shielding function for the RF contacts 210 using the double-shielding walls. Thus, the board connector 200 according to the first embodiment can contribute to further improving EMI shielding performance and EMC performance by using the double-shielding walls.

The outer grounding wall 232 may be grounded by being mounted on the first board. In this case, the grounding housing 230 may be grounded through the outer grounding wall 232. The bottom of the outer grounding wall 232 may be mounted on the first board. In this case, the outer grounding wall 232 may be formed as a greater height than the inner grounding wall 231.

The grounding connection wall 233 is coupled to the inner grounding wall 231 and the outer grounding wall 232. The grounding connection wall 233 may be disposed between the inner grounding wall 231 and the outer grounding wall 232. The inner grounding wall 231 and the outer grounding wall 232 may be electrically connected to each other through the grounding connection wall 233. Thus, when the outer grounding wall 232 is grounded by being mounted on the first board, the grounding connection wall 233 and the inner grounding wall 231 may also be grounded to implement the shielding function. When the plug connector is inserted into the inner space 230*a*, the grounding connection wall 233 may be connected to the grounding housing of the plug connector.

The grounding connection wall 233 may be coupled to the top of the outer grounding wall 232 and the top of the inner grounding wall 231. The grounding connection wall 233 may be formed in a horizontally disposed plate shape, and the outer grounding wall 232 and the inner grounding wall 231 may be formed in a vertically disposed plate shape. The grounding connection wall 233, the outer grounding wall 232, and the inner grounding wall 231 may be integrally formed.

The grounding housing 230 may include a grounding floor 234.

The grounding floor 234 may protrude from the inner grounding wall 231 to the inner space 230*a*. The grounding floor 234 may protrude from the bottom of the inner grounding wall 231 to the inner space 230*a*. Thus, the board connector 200 according to the first embodiment can further strengthen the shielding function for the first RF contact 211 and the second RF contact 212 by implementing a shielding function for the floor of the grounding housing 230 using the grounding floor 234. When the plug connector is inserted into the inner space 230*a*, the grounding floor 234 may be connected to the grounding housing of the plug connector. Thus, the board connector 200 according to the first embodiment can further strengthen the shielding function by increasing a contact area through the connection between the grounding floor 234 and the grounding housing of the plug connector. Also, by increasing the contact area between the grounding housing 230 and the grounding housing of the plug connector, the board connector 200 according to the first embodiment may reduce electrical adverse effects such as crosstalk that may be caused by mutual capacitance or inductance between adjacent terminals. In this case, the board connector 200 according to the first embodiment can further strengthen the EMI shielding performance because the board connector 200 can secure a path through which electromagnetic waves are introduced to the grounding of at least one of the first board and the second board. The grounding floor 234 may be formed in a horizontally disposed plate shape.

Figure 11:
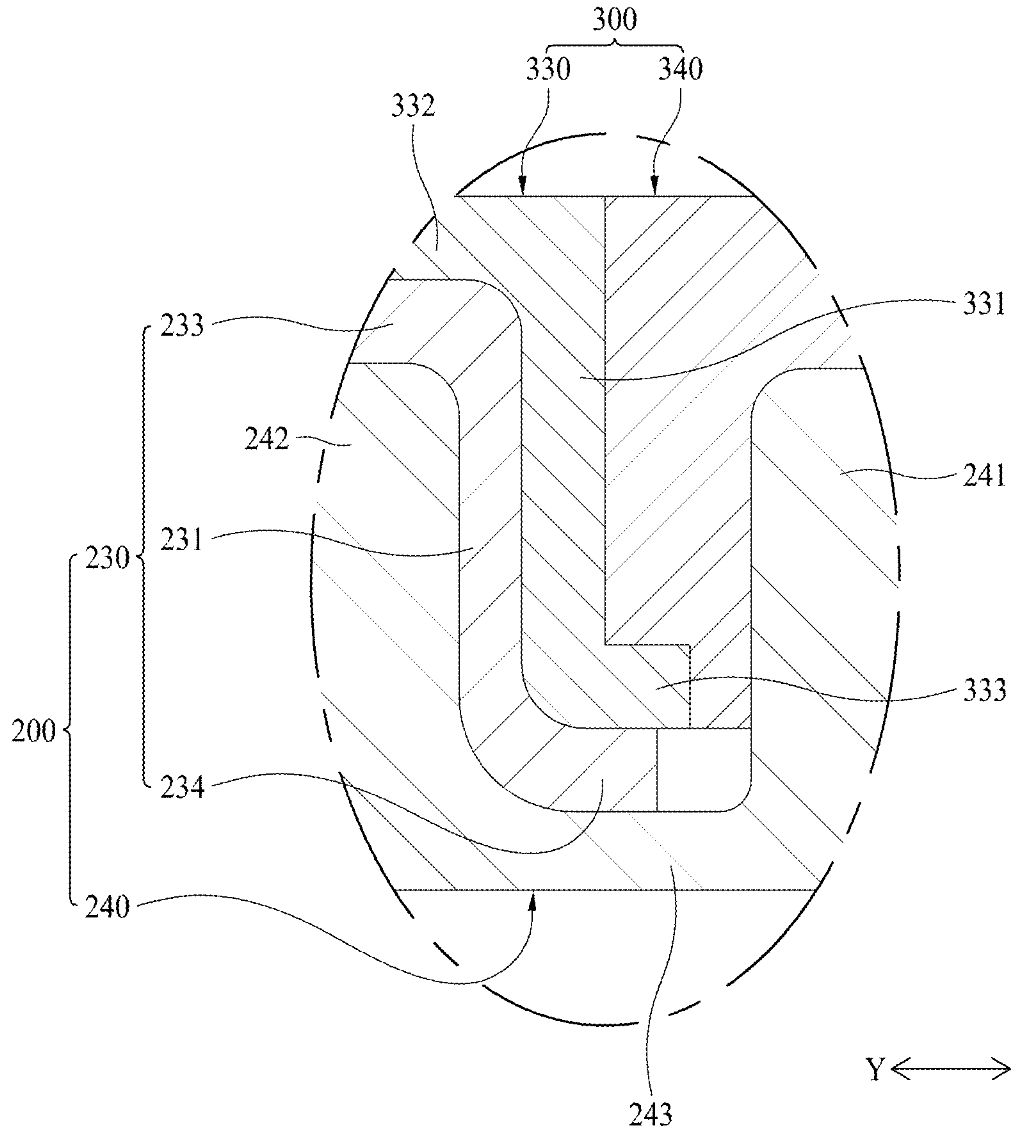

A connection portion between the grounding floor 234 and the outer grounding wall 232 may be formed in a rounded shape as shown in FIG. 11. Thus, the connection portion between the grounding floor 234 and the outer grounding wall 232 may serve as a guide for the plug connector when the plug connector is inserted into the inner space 230*a*. In this case, a portion toward the inner space 230*a* in the connection portion between the grounding floor 234 and the outer grounding wall 232 may be formed in a rounded shape to form a curved surface.

The grounding floor 234, the grounding connection wall 233, the outer grounding wall 232, and the inner grounding wall 231 may be integrally formed. In this case, the grounding housing 230 may be integrally formed without seams. The grounding housing 230 may be integrally formed without seams by a metal injection process such as metal die casting and metal injection molding (MIM). The grounding housing 230 may be integrally formed without seams through computer numerical control (CNC) processing, machining center tool (MCT) processing, or the like.

Referring to FIGS. 2 to 12, the grounding housing 230 may include the following configuration to further strengthen the shielding function by improving the contact between the inner grounding wall 231 and the grounding housing of the plug connector.

Figure 8:
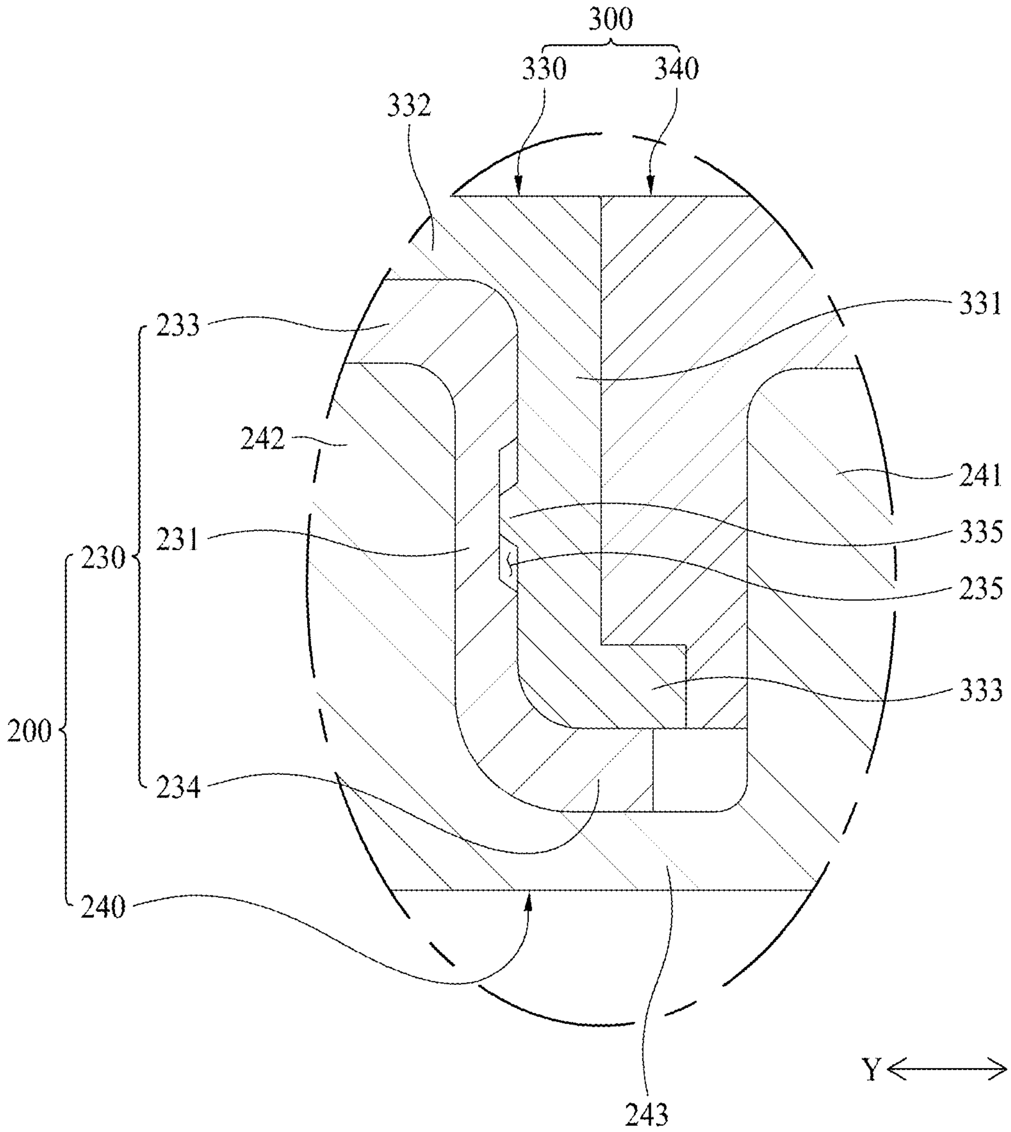
FIGS. 8 to 12 are schematic side-sectional views showing an enlarged portion A of FIG. 7 in an aspect in which the board connector according to the first embodiment and a board connector according to a second embodiment are coupled.

First, as shown in FIG. 8, the grounding housing 230 may include a connection groove 235. The connection groove 235 may be formed on an inner surface of the inner grounding wall 231. The inner surface of the inner grounding wall 231 is a surface that is toward the inner space 230*a*. The connection groove 235 may be implemented as a groove formed on the inner surface of the inner grounding wall 231 to a predetermined depth. A grounding housing 330 of the plug connector may be inserted into the connection groove 235. In this case, a connection protrusion 335 of the grounding housing 330 of the plug connector may be inserted into the connection groove 235. Thus, the board connector 200 according to the first embodiment can further strengthen the shielding function for the first RF contact 211 and the second RF contact 212 by using the connection groove 235 to improve the contact between the grounding housing 230 and the grounding housing 330 of the plug connector. In FIG. 8, it is shown that the connection groove 235 is formed to be a greater length in the vertical direction than the connection protrusion 335. However, the present disclosure is not limited thereto, and the connection groove 235 and the connection protrusion 335 may be formed to be substantially the same length. Meanwhile, the inner grounding wall 231 may prevent the connection protrusion 335 from falling out of the connection groove 235 by supporting the connection protrusion 335 inserted into the connection groove 235. The grounding housing 230 may include a plurality of connection grooves 235. In this case, the connection grooves 235 may be spaced apart from one another on the inner surface of the inner grounding wall 231.

Figure 9:
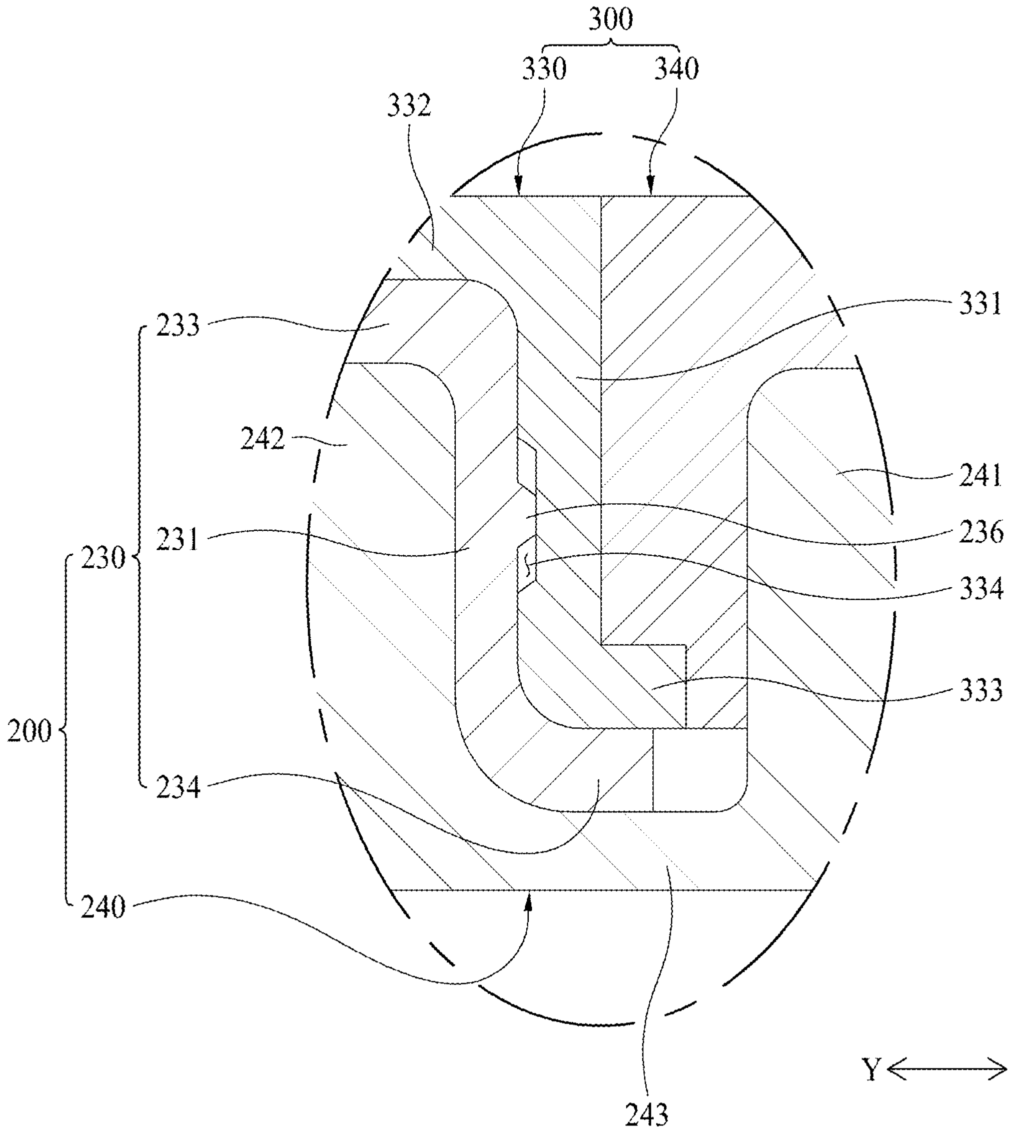

Next, as shown in FIG. 9, the grounding housing 230 may include a connection protrusion 236. The connection protrusion 236 may be formed on the inner surface of the inner grounding wall 231. The connection protrusion 236 may protrude from the inner surface of the inner grounding wall 231. The connection protrusion 236 may be inserted into the grounding housing 330 of the plug connector. In this case, the connection protrusion 236 may be inserted into the connection groove 334 of the grounding housing 330 of the plug connector. Thus, the board connector 200 according to the first embodiment can further strengthen the shielding function for the first RF contact 211 and the second RF contact 212 by using the connection protrusion 236 to improve the contact between the grounding housing 230 and the grounding housing 330 of the plug connector. In FIG. 9, it is shown that the connection protrusion 236 is formed to be a lesser length in the vertical direction than the connection groove 334. However, the present disclosure is not limited thereto, and the connection protrusion 236 and the connection groove 334 may be formed to be substantially the same length. Meanwhile, since the connection protrusion 236 is inserted into the connection groove 334 and supported by the grounding housing 330, the connection protrusion 236 can be prevented from falling out of the connection groove 334. The grounding housing 230 may include a plurality of connection protrusions 236. In this case, the connection protrusions 236 may be spaced apart from one another on the inner surface of the inner grounding wall 231.

Figure 10:
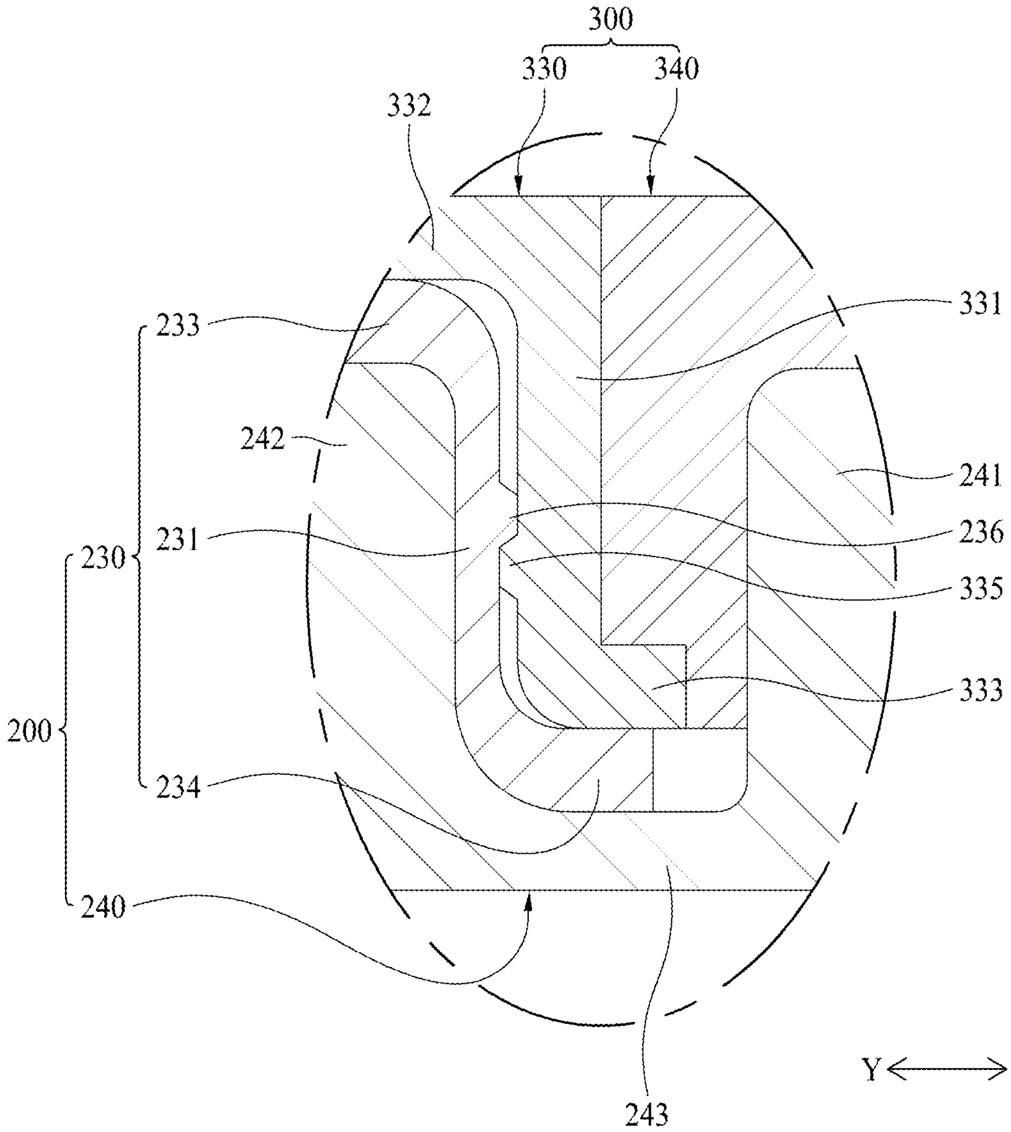

Next, as shown in FIG. 10, when the grounding housing 230 includes the connection protrusion 236, the connection protrusion 236 may support the connection protrusion 335 of the grounding housing 330 of the plug connector. Thus, the board connector 200 according to the first embodiment can further strengthen the shielding function for the first RF contact 211 and the second RF contact 212 by using the connection protrusion 236 to improve the contact between the grounding housing 230 and the grounding housing 330 of the plug connector. Meanwhile, the connection protrusion 236 may be disposed above the connection protrusion 335 to support the connection protrusion 335, thereby preventing the connection protrusion 335 from falling out.

Figure 12:
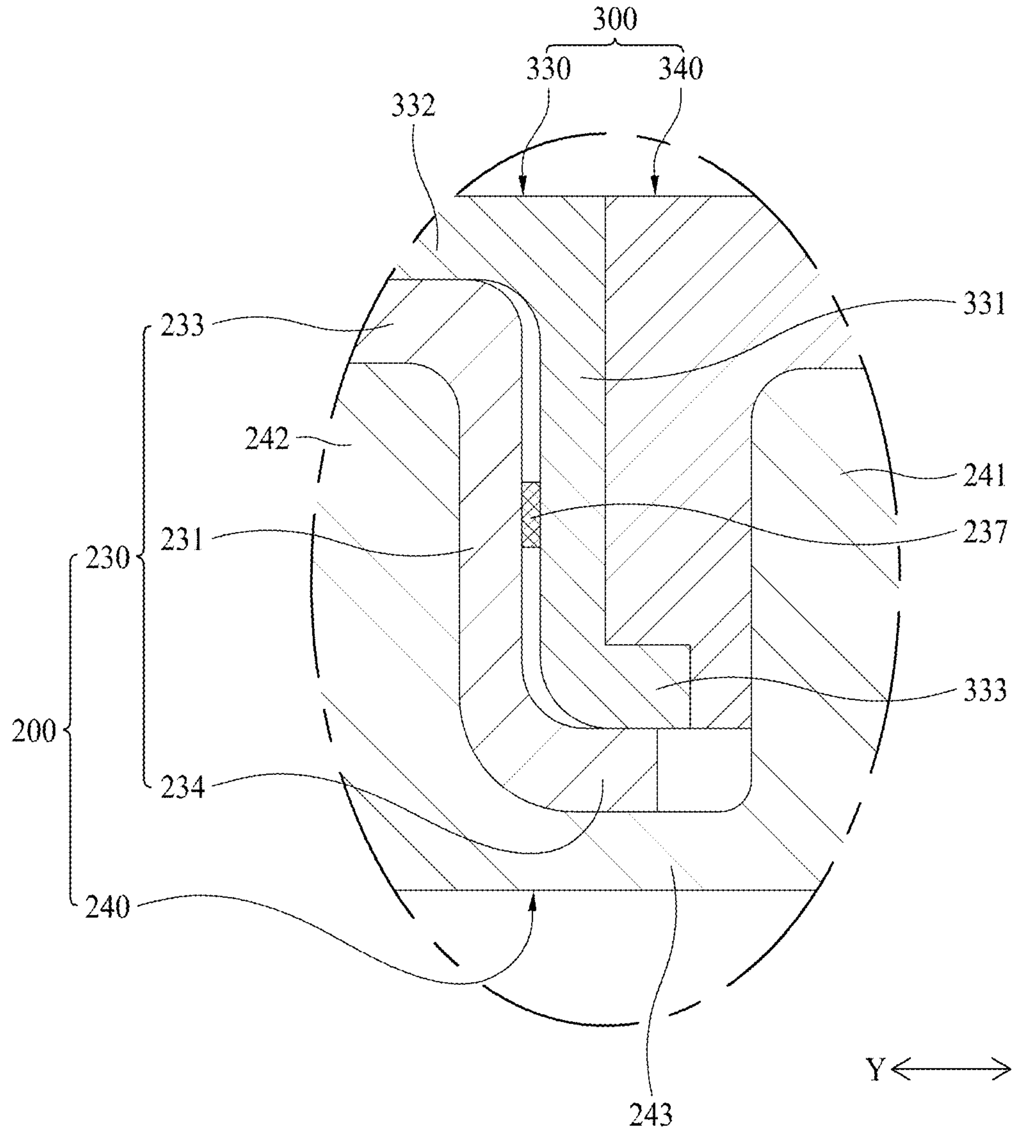

Next, as shown in FIG. 11, the grounding housing 230 may be brought into contact with the grounding housing 330 of the plug connector through the surface contact between the inner surface of the inner grounding wall 231 and the grounding housing 330 of the plug connector. In this case, a gap may occur between the inner surface of the inner grounding wall 231 and the grounding housing 330 of the plug connector. In order to compensate for the gap, as shown in FIG. 12, the grounding housing 230 may include a conductive member 237. The conductive member 237 may be coupled to the inner surface of the inner grounding wall 231. The conductive member 237 may be formed in a closed ring shape that extends on the inner surface of the inner grounding wall 231 including a corner portion 231*a* (see FIG. 6) of the inner surface of the inner grounding wall 231. Thus, the board connector 200 according to the first embodiment can further strengthen the shielding function for the first RF contact 211 and the second RF contact 212 by using the conductive member 237 to improve the contact between the grounding housing 230 and the grounding housing 330 of the plug connector. Also, implementation is difficult in the corner portion 231*a* of the inner surface of the inner grounding wall 231 in the embodiment using the connection protrusion 236 and the connection groove 235. On the other hand, it is possible to improve the easiness of the implementation in the corner portion 231*a* of the inner surface of the inner grounding wall 231 in the embodiment using the conductive member 237. The conductive member 237 may be formed of an electrically conductive material to electrically connect the inner grounding wall 231 and the grounding housing 330 of the plug connector, For example, the conductive member 237 may be formed of metal. The conductive member 237 may be separately produced and then coupled to the inner grounding wall 231 through mounting, attachment, and fastening to the inner surface of the inner grounding wall 231. The conductive member 237 may be coupled to the inner grounding wall 231 by applying a conductive shielding material to the inner surface of the inner grounding wall 231.

Figure 13:
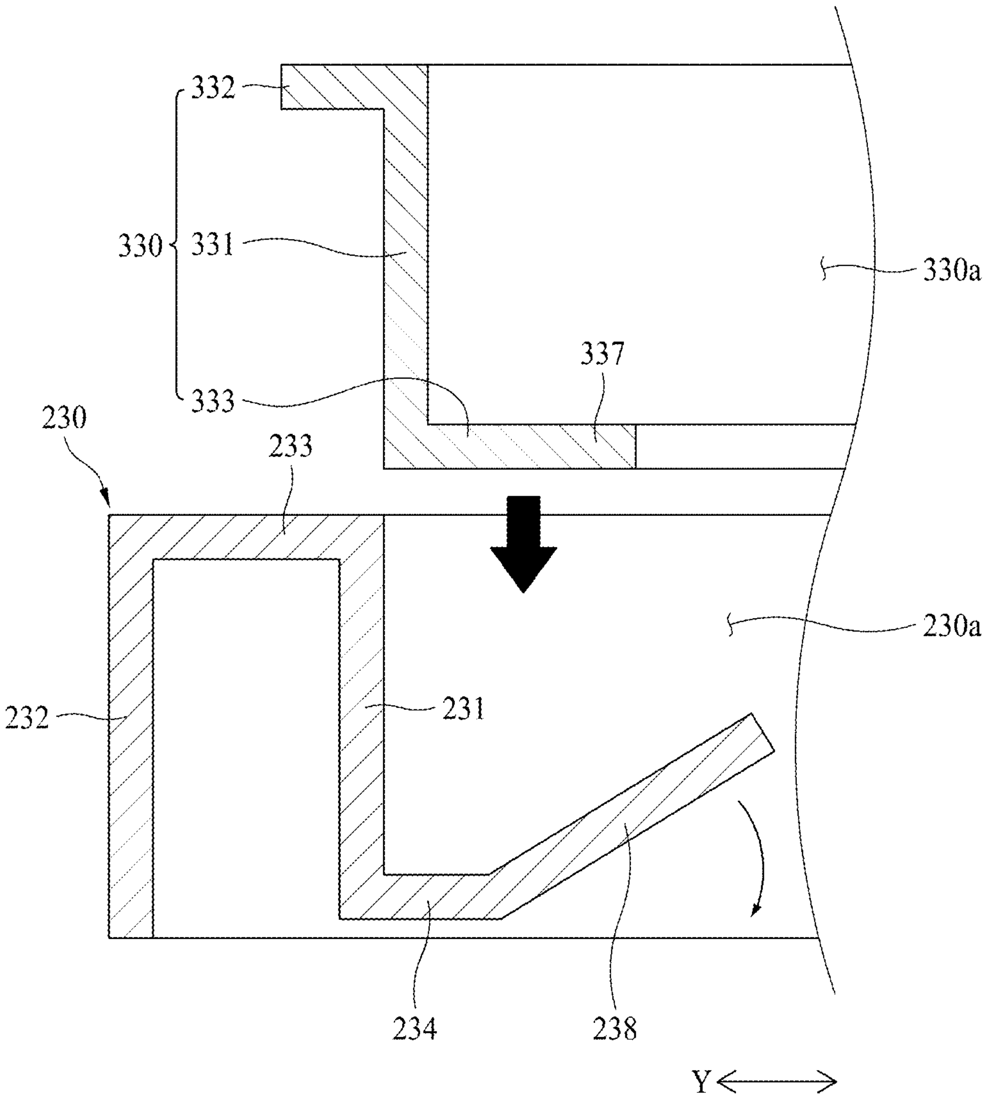
FIG. 13 is a schematic side-sectional view that is taken along line II-II of FIG. 6 and that shows a coupling relationship between a grounding housing of the board connector according to the first embodiment and a grounding housing of the board connector according to the second embodiment.

Referring to FIGS. 2 to 13, the grounding housing 230 may include a grounding arm 238 (see FIG. 13).

The grounding arm 238 may protrude from the grounding floor 234 toward the inner space 230*a*. The grounding arm 238 may be inclined to increase in height as the grounding arm 238 protrudes toward the inner space 230*a*. Accordingly, when the plug connector is inserted into the inner space 230*a*, the grounding arm 238 may be pressed against the grounding housing 330 of the plug connector and thus can rotate and move downward from a point connected to the grounding floor 234. Thus, the grounding arm 238 places pressure on the grounding housing 330 using a restoring force and thus comes into strong contact with the grounding housing 330. Accordingly, the board connector 200 according to the first embodiment can further strengthen the shielding function for the first RF contact 211 and the second RF contact 212 by using the grounding arm 238 to improve the contact between the grounding housing 230 and the grounding housing 330 of the plug connector. The grounding housing 230 may include a plurality of grounding arms 238. In this case, the grounding arms 238 may be spaced apart from one another along the grounding floor 234.

Figure 5:
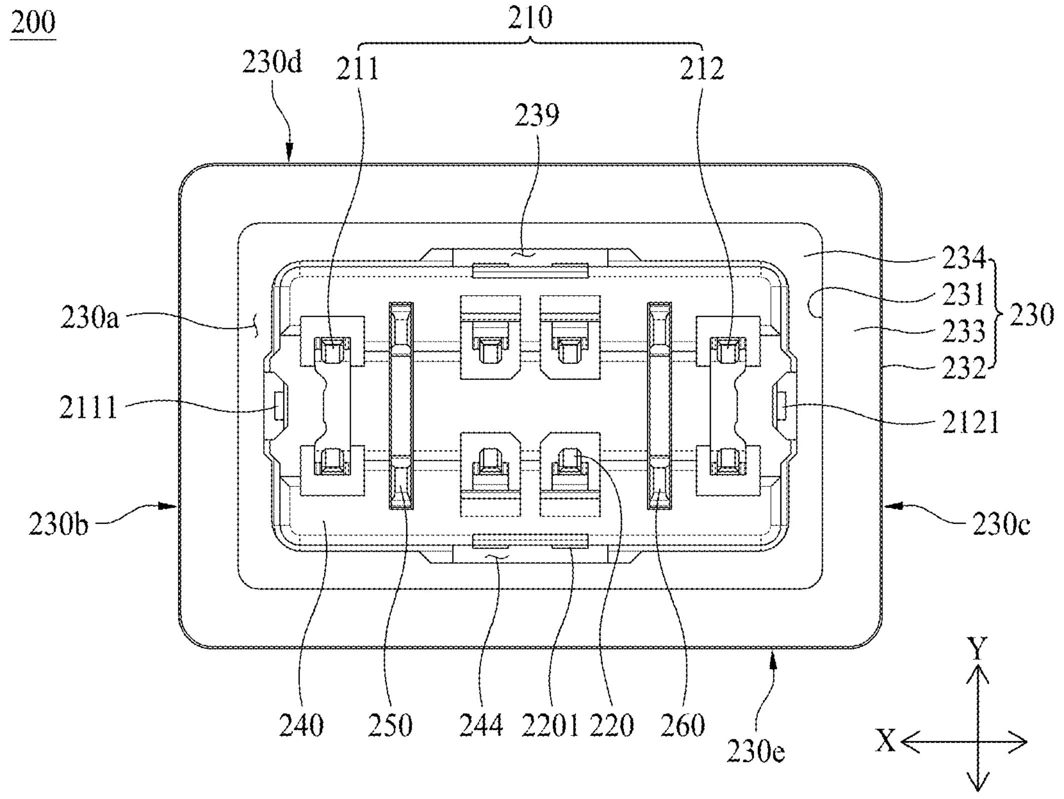
FIG. 5 is a schematic plan view of the board connector according to the first embodiment.
Figure 6:
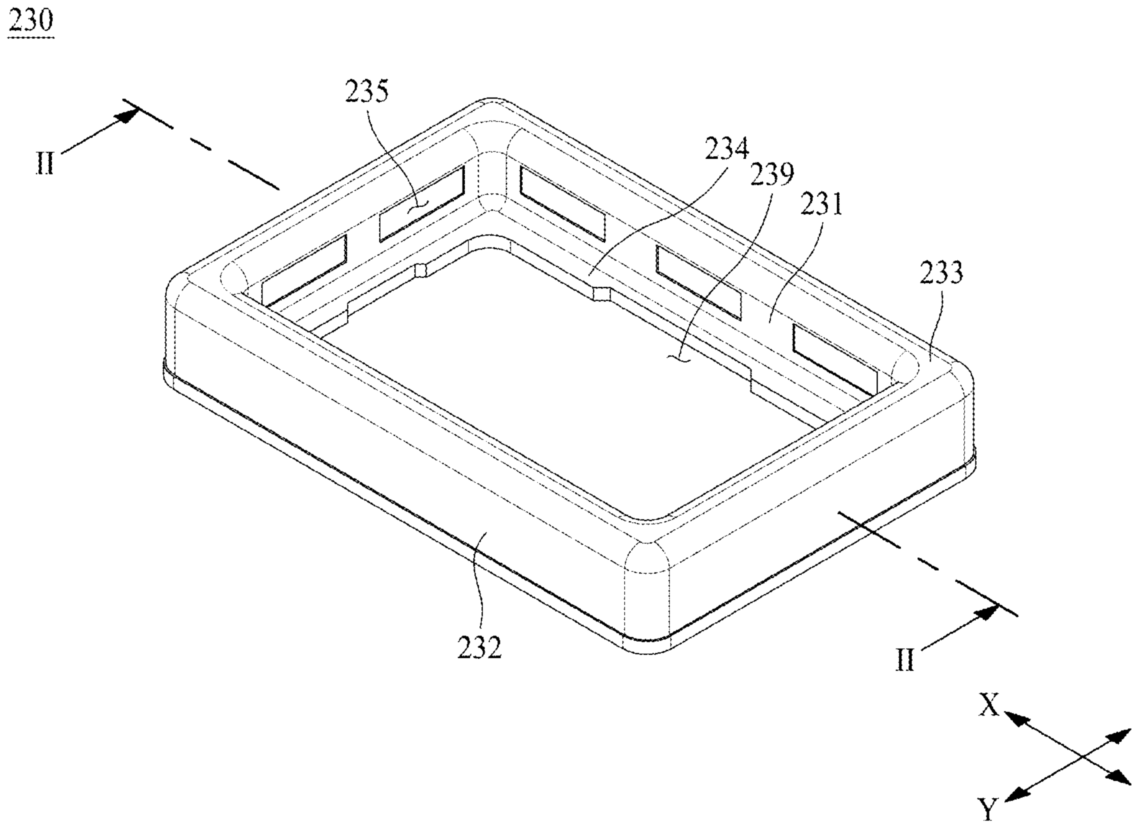
FIG. 6 is a schematic perspective view of a grounding housing of the board connector according to the first embodiment.

Referring to FIGS. 2 to 13, the grounding housing 230 may include a soldering inspection window 239 (see FIGS. 5 and 6).

The soldering inspection window 239 may be formed through the grounding housing 230. The soldering inspection window 239 may be used to inspect a state in which the first RF mounting member 2111 is mounted on the first board. In this case, the first RF contact 211 may be coupled to the insulating part 240 such that the first RF mounting member 2111 is placed at a position corresponding to the soldering inspection window 239. Thus, the first RF mounting member 2111 is not covered by the grounding housing 230. Accordingly, while the board connector 200 according to the first embodiment is mounted on the first board, it is possible for a worker to inspect a state in which the first RF mounting member 2111 is mounted on the first board through the soldering inspection window 239. Thus, the board connector 200 according to the first embodiment can improve the accuracy of a mounting operation for mounting the first RF contact 211 on the first board even if the entirety of the first RF contact 211 including the first RF mounting member 2111 is placed on the inner side of the grounding housing 230. The soldering inspection window 239 may be implemented as a groove formed on the grounding floor 234 to a certain depth.

The grounding housing 230 may include a plurality of soldering inspection windows 239. In this case, the second RF mounting member 2121 and the transmission mounting members 2201 may be placed at positions corresponding to the soldering inspection windows 239. Accordingly, while the board connector 200 according to the first embodiment is mounted on the first board, it is possible for a worker to inspect a state in which the first RF mounting member 2111, the second RF mounting member 2121, and the transmission mounting members 2201 are mounted on the first board through the soldering inspection windows 239. Thus, the board connector 200 according to the first embodiment can improve the accuracy of the operation of mounting the first RF contact 211, the second RF contact 212, and the transmission contacts 220 on the first board.

Referring to FIGS. 2 to 12, the insulating part 240 may support the RF contacts 210. The RF contacts 210 and the transmission contacts 220 may be coupled to the insulating part 240. The insulating part 240 may be formed of an insulating material. The insulating part 240 may be coupled to the grounding housing 230 so that the RF contacts 210 are placed in the inner space 230*a*.

The insulating part 240 may include an insulating member 241.

The insulating member 241 supports the RF contacts 210 and the transmission contacts 220. The insulating member 241 may be placed in the inner space 230*a*. The insulating member 241 may be placed on an inner side of the grounding floor 234. In this case, the grounding floor 234 may be placed between the inner grounding wall 231 and the insulating member 241. The grounding floor 234 may be disposed to surrounding an outer surface of the insulating member 241.

The insulating part 240 may include an insertion member 242 and a connection member 243.

The insertion member 242 may be inserted between the inner grounding wall 231 and the outer grounding wall 232. Since the insertion member 242 is inserted between the inner grounding wall 231 and the outer grounding wall 232, the insulating part 240 may be coupled to the grounding housing 230. The insertion member 242 may be inserted between the inner grounding wall 231 and the outer grounding wall 232 by using interference fitting. The insertion member 242 may be disposed on an outer side of the insulating member 241. The insertion member 242 may be disposed to surround the outer side of the insulating member 241.

The connection member 243 may be coupled to the insertion member 242 and the insulating member 241. The insertion member 242 and the insulating member 241 may be connected to each other through the connection member 243. The connection member 243 may be formed to a vertically less height than the insertion member 242 and the insulating member 241. Thus, a space is provided between the insertion member 242 and the insulating member 241, and the plug connector may be inserted into the corresponding space. The connection member 243 may be disposed under the grounding floor 234. In this case, the grounding floor 234 may be disposed to cover the connection member 243. The connection member 243, the insertion member 242, and the insulating member 241 may be integrally formed.

Referring to FIGS. 2 to 7, the insulating part 240 may include a soldering inspection window 244 (see FIG. 5).

The soldering inspection window 244 may be formed through the insulating part 240. The soldering inspection window 244 may be used to inspect a state in which the first RF mounting member 2111 is mounted on the first board. In this case, the first RF contact 211 may be coupled to the insulating part 240 such that the first RF mounting member 2111 is placed at the soldering inspection window 244. Thus, the first RF mounting member 2111 is not covered by the insulating part 240. Accordingly, while the board connector 200 according to the first embodiment is mounted on the first board, it is possible for a worker to inspect a state in which the first RF mounting member 2111 is mounted on the first board through the soldering inspection window 244. Thus, the board connector 200 according to the first embodiment can improve the accuracy of a mounting operation for mounting the first RF contact 211 on the first board even if the entirety of the first RF contact 211 including the first RF mounting member 2111 is placed on the inner side of the grounding housing 230. The soldering inspection window 244 may be formed through the insulating member 241.

The insulating part 240 may include a plurality of soldering inspection windows 244. In this case, the second RF mounting member 2121 and the transmission mounting members 2201 may be placed at the soldering inspection windows 244. Accordingly, while the board connector 200 according to the first embodiment is mounted on the first board, it is possible for a worker to inspect a state in which the first RF mounting member 2111, the second RF mounting member 2121, and the transmission mounting members 2201 are mounted on the first board through the soldering inspection windows 244. Thus, the board connector 200 according to the first embodiment can improve the accuracy of the operation of mounting the first RF contact 211, the second RF contact 212, and the transmission contacts 220 on the first board.

Figure 7:
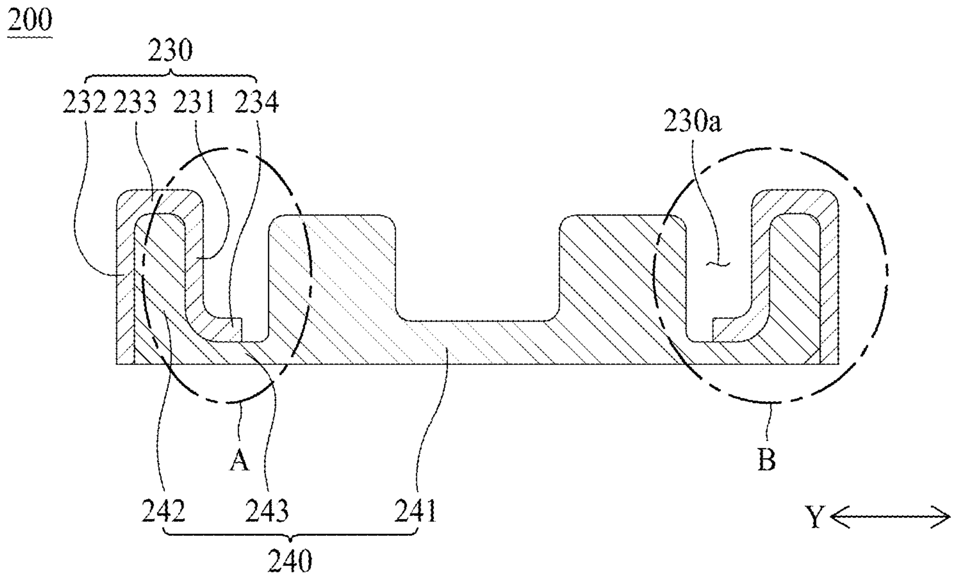
FIG. 7 is a schematic side-sectional view taken along line I-I of FIG. 2.
Figure 14:
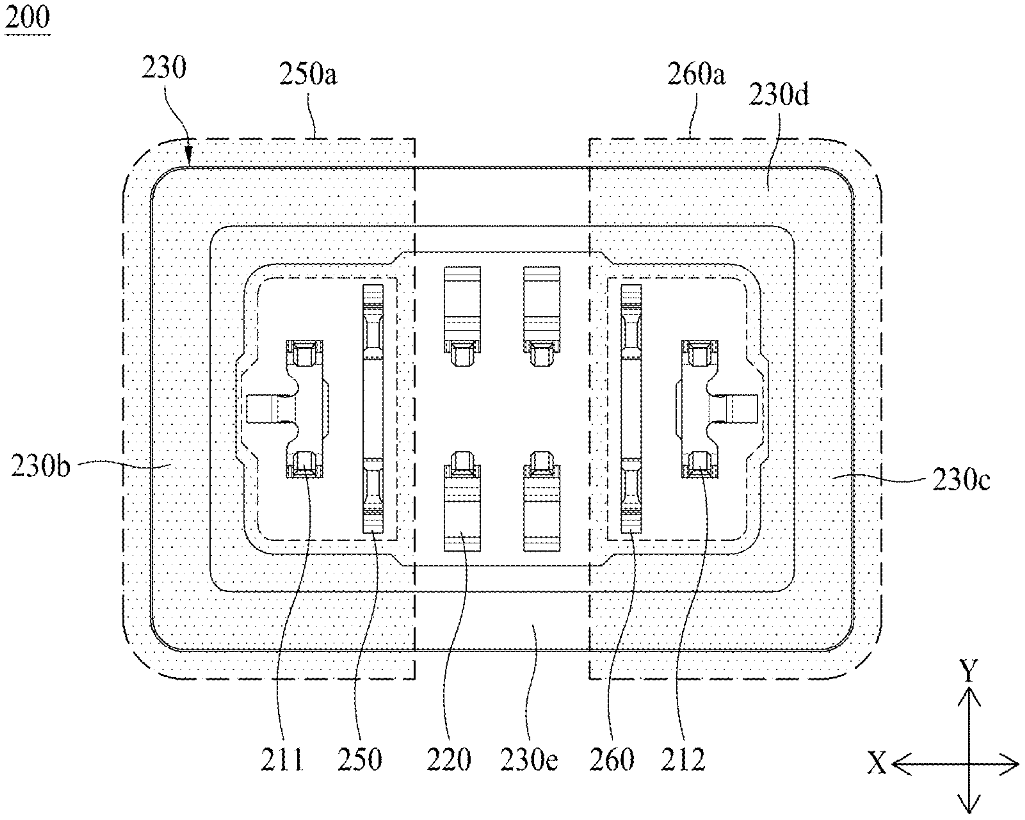
FIG. 14 is a schematic plan view illustrating a grounding loop in the board connector according to the first embodiment.

Referring to FIGS. 2, 7, and 14, the board connector 200 according to the first embodiment may include a first grounding contact 250.

The first grounding contact 250 is coupled to the insulating part 240. The first grounding contact 250 may be grounded by being mounted on the first board. The first grounding contact 250 may be coupled to the insulating part 240 through an assembly process. The first grounding contact 250 may be integrally molded with the insulating part 240 through injection molding.

The first grounding contact 250 may implement the shielding function for the first RF contact 211 together with the grounding housing 230. In this case, as shown in FIG. 5, the grounding housing 230 may include a first double-shielding wall 230*b*, a second double-shielding wall 230*c*, a third double-shielding wall 230*d*, and a fourth double-shielding wall 230*e*. The first double-shielding wall 230*b*, the second double-shielding wall 230*c*, the third double-shielding wall 230*d*, and the fourth double-shielding wall 230*e* may be implemented along the inner grounding wall 231, the outer grounding wall 232, and the grounding connection wall 233. The first double-shielding wall 230*b* and the second double-shielding wall 230*c* may be disposed to face each other in the first axial direction (x-axis direction). The first RF contact 211 may be placed between the first double-shielding wall 230*b* and the second double-shielding wall 230*c* in the first axial direction (x-axis direction). The first RF contact 211 may be placed at a position where the spacing from the first double-shielding wall 230*b* is shorter than the spacing from the second double-shielding wall 230*c* in the first axial direction (X-axis direction). The third double-shielding wall 230*d* and the fourth double-shielding wall 230*e* may be disposed to face each other in the second axial direction (y-axis direction). The first RF contact 211 may be placed between the third double-shielding wall 230*d* and the fourth double-shielding wall 230*e* in the second axial direction (y-axis direction). The first RF contact 211 may be spaced an approximately equal distance from each of the third double-shielding wall 230*d* and the fourth double-shielding wall 230*e* in the second axial direction (y-axis direction).

The first grounding contact 250 may be disposed between the first RF contact 211 and the transmission contacts 220 in the first axial direction (x-axis direction). Accordingly, the first RF contact 211 may be placed between the first double-shielding wall 230*b* and the first grounding contact 250 in the first axial direction (x-axis direction) and may be placed between the third double-shielding wall 230*d* and the fourth double-shielding wall 230*e* in the second axial direction (y-axis direction). Accordingly, the board connector 200 according to the first embodiment can strengthen the shielding function for the first RF contact 211 using the first grounding contact 250, the first double-shielding wall 230*b*, the third double-shielding wall 230*d*, and the fourth double-shielding wall 230*e*.

The first grounding contact 250, the first double-shielding wall 230*b*, the third double-shielding wall 230*d*, and the fourth double-shielding wall 230*e* may be disposed on four sides with respect to the first RF contact 211 to implement shielding against RF signals. In this case, the first grounding contact 250, the first double-shielding wall 230*b*, the third double-shielding wall 230*d*, and the fourth double-shielding wall 230*e* may implement a grounding loop 250*a* (see FIG. 14) for the first RF contact 211. Accordingly, the board connector 200 according to the first embodiment can realize complete shielding for the first RF contact 211 by further strengthening the shielding function for the first RF contact 211 using the grounding loop 250*a*.

The first grounding contact 250 may be formed of an electrically conductive material. For example, the first grounding contact 250 may be formed of metal. When the plug connector is inserted into the inner space 230*a*, the first grounding contact 250 may be connected to the grounding contact of the plug connector.

Referring to FIGS. 2, 7, and 14, the board connector 200 according to the first embodiment may include a second grounding contact 260.

The second grounding contact 260 is coupled to the insulating part 240. The second grounding contact 260 may be grounded by being mounted on the first board. The second grounding contact 260 may be coupled to the insulating part 240 through an assembly process. The second grounding contact 260 may be integrally molded with the insulating part 240 through injection molding.

The second grounding contact 260 may implement the shielding function for the second RF contact 212 together with the grounding housing 230. The second grounding contact 260 may be disposed between the second RF contact 212 and the transmission contacts 220 in the first axial direction (x-axis direction). Accordingly, the second RF contact 212 may be placed between the second double-shielding wall 230*c* and the second grounding contact 260 in the first axial direction (x-axis direction) and may be placed between the third double-shielding wall 230*d* and the fourth double-shielding wall 230*e* in the second axial direction (y-axis direction). Accordingly, the board connector 200 according to the first embodiment can strengthen the shielding function for the second RF contact 212 using the second grounding contact 260, the second double-shielding wall 230*c*, the third double-shielding wall 230*d*, and the fourth double-shielding wall 230*e*.

The second grounding contact 260, the second double-shielding wall 230*c*, the third double-shielding wall 230*d*, and the fourth double-shielding wall 230*e* may be disposed on four sides with respect to the second RF contact 212 to implement shielding against RF signals. In this case, the second grounding contact 260, the second double-shielding wall 230*c*, the third double-shielding wall 230*d*, and the fourth double-shielding wall 230*e* may implement a grounding loop 260*a* (see FIG. 14) for the second RF contact 212. Accordingly, the board connector 200 according to the first embodiment can realize complete shielding for the second RF contact 212 by further strengthening the shielding function for the second RF contact 212 using the grounding loop 260*a*.

The second grounding contact 260 may be formed of an electrically conductive material. For example, the second grounding contact 260 may be formed of metal. When the plug connector is inserted into the inner space 230*a*, the second grounding contact 260 may be connected to the grounding contact of the plug connector.

Referring to FIGS. 15 to 20, the board connector 200 according to the first embodiment may be implemented such that the grounding housing 230 and the insulating part 240 are firmly coupled. This can be specifically described as follows.

Figure 15:
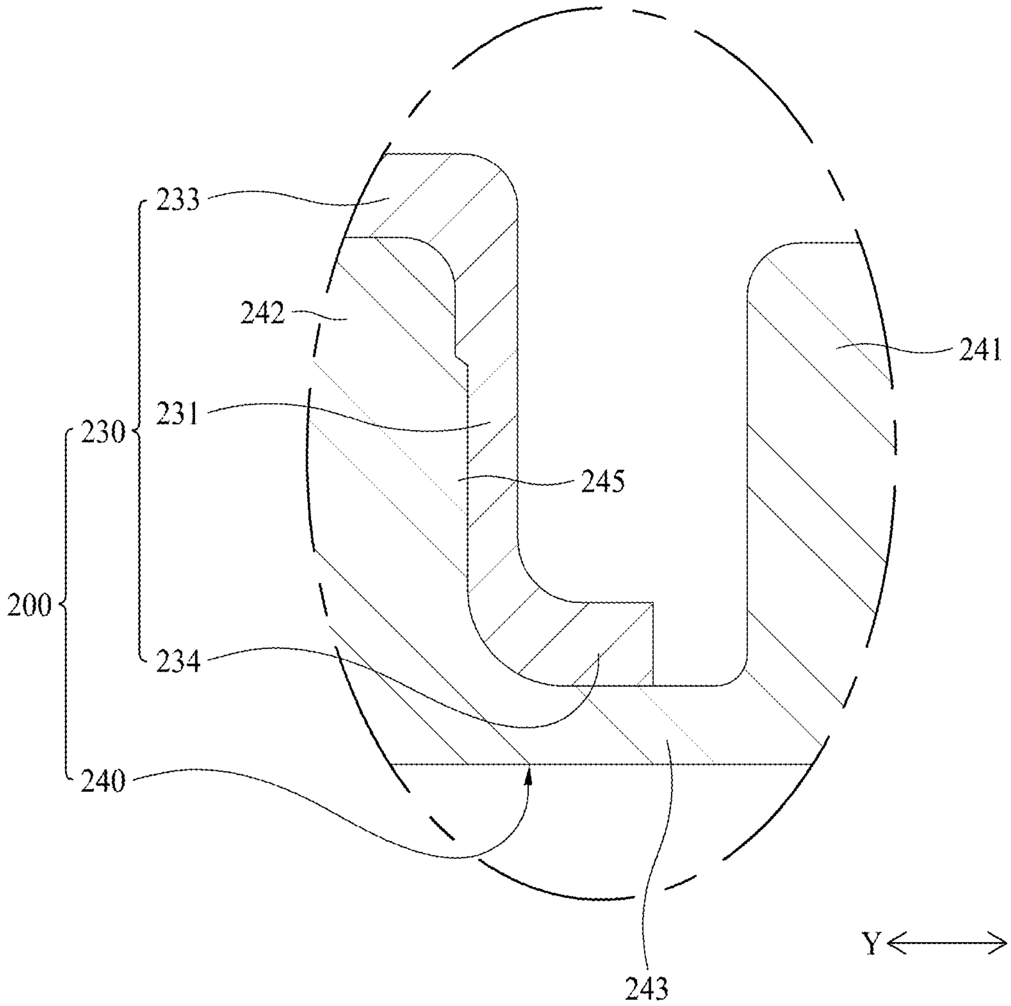
FIGS. 15 and 16 are schematic side-sectional views showing the enlarged portion A of FIG. 7 to illustrate a coupling relationship between an insulating part and the grounding housing of the board connector according to the first embodiment.

First, as shown in FIG. 15, the insulating part 240 may include a protrusion member 245. The protrusion member 245 may protrude from the insertion member 242. The protrusion member 245 may protrude from the inner surface of the insertion member 242, which faces the inner space 230*a* (see FIG. 2), to the inner space 230*a* (see FIG. 2). When the grounding housing 230 and the insulating part 240 are coupled, the protrusion member 245 may apply pressure on the inner grounding wall 231. A face of the inner grounding wall 231 facing the insertion member 242 may receive pressure from the protrusion member 245. Since the protrusion member 245 places pressure on the inner grounding wall 231, the grounding housing 230 and the insulating part 240 may be firmly coupled through fitting. The protrusion member 245 and the insertion member 242 may be integrally formed. Although not shown, the insulating part 240 may include a plurality of protrusion members 245. The protrusion members 245 may protrude from the insertion member 242 at positions spaced apart from each other.

Figure 16:
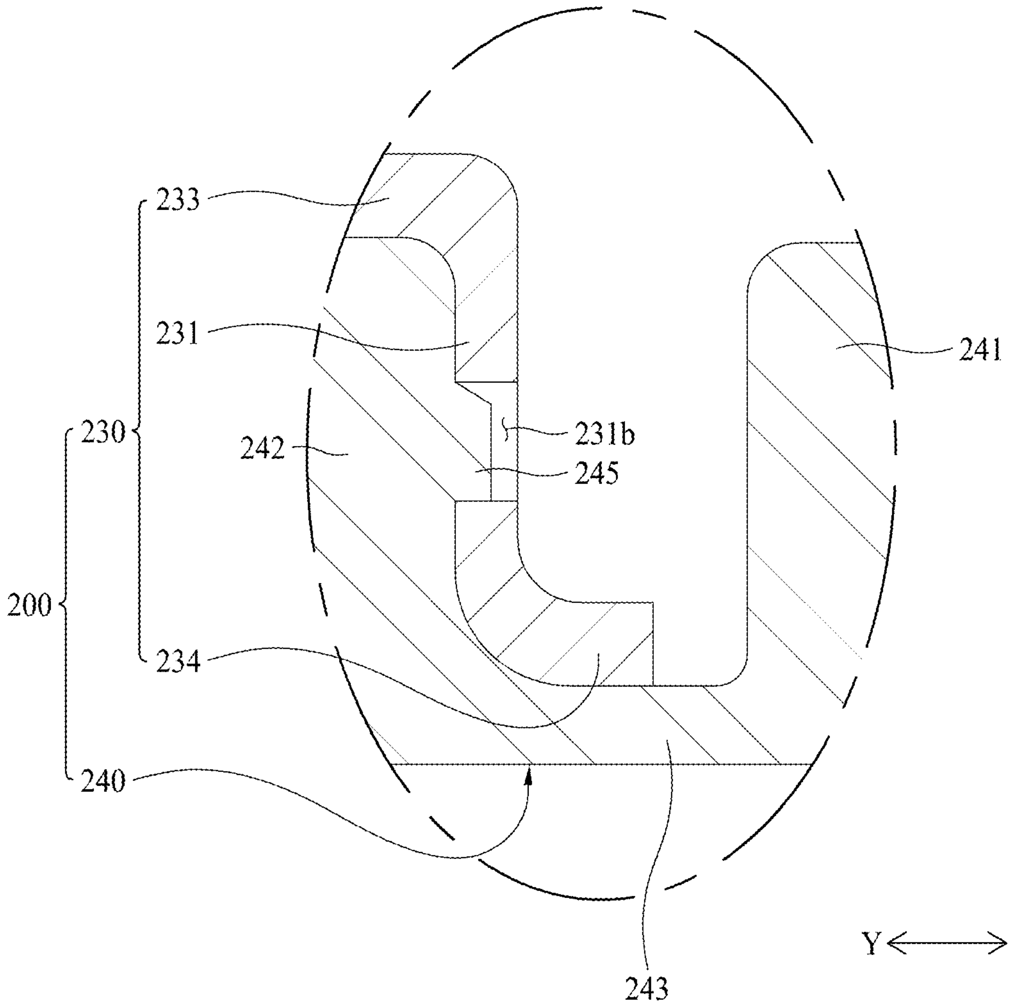

Next, as shown in FIG. 16, the insulating part 240 may include the protrusion member 245. The protrusion member 245 may protrude from the insertion member 242. The protrusion member 245 may protrude from the inner surface of the insertion member 242, which faces the inner space 230*a* (see FIG. 2), to the inner space 230*a* (see FIG. 2).

The grounding housing 230 may include an inner wall hole 231*b*. The inner wall hole 231*b* may be formed through the inner grounding wall 231. When the grounding housing 230 and the insulating part 240 are coupled, the protrusion member 245 may be inserted into the inner wall hole 231*b*. Thus, the protrusion member 245 supports the inner grounding wall 231, and thus the grounding housing 230 and the insulating part 240 may be firmly coupled. The protrusion member 245 and the insertion member 242 may be integrally formed. Although not shown, the insulating part 240 may include a plurality of protrusion members 245. The protrusion members 245 may protrude from the insertion member 242 at positions spaced apart from each other. In this case, the grounding housing 230 may include a plurality of inner wall holes 231*b*. The inner wall holes 21*b* may be formed through the inner grounding wall 231 at positions spaced apart from each other.

Figure 17:
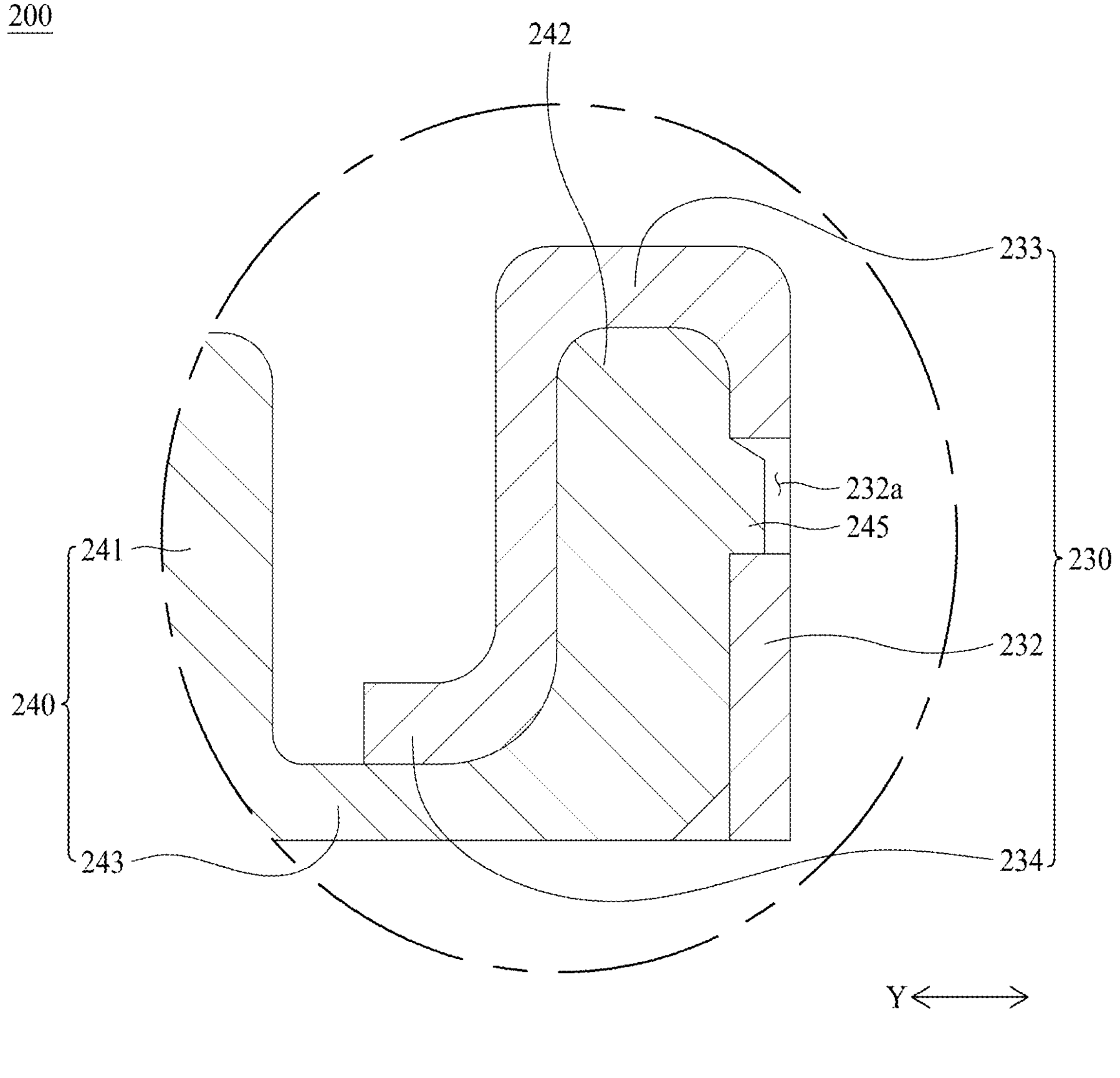
FIG. 17 is a schematic side-sectional view showing an enlarged portion B of FIG. 7 to illustrate a coupling relationship between the insulating part and the grounding housing of the board connector according to the first embodiment.

Next, as shown in FIG. 17, the insulating part 240 may include the protrusion member 245. The protrusion member 245 may protrude from the insertion member 242. The protrusion member 245 may protrude outward from an outer surface of the insertion member 242. The outer surface of the insertion member 242 may be a face placed opposite to the inner surface of the insertion member 242. The outer side is a side opposite to the side facing the inner space 230*a*.

The grounding housing 230 may include an outer wall hole 232*a*. The outer wall hole 232*a* may be formed through the outer grounding wall 232. When the grounding housing 230 and the insulating part 240 are coupled, the protrusion member 245 may be inserted into the outer wall hole 232*a*. Thus, the protrusion member 245 supports the outer grounding wall 232, and thus the grounding housing 230 and the insulating part 240 may be firmly coupled. The protrusion member 245 and the insertion member 242 may be integrally formed. Although not shown, the insulating part 240 may include a plurality of protrusion members 245. The protrusion members 245 may protrude from the insertion member 242 at positions spaced apart from each other. In this case, the grounding housing 230 may include a plurality of outer wall holes 232*a*. The outer wall holes 232*a* may be formed through the outer grounding wall 232 at positions spaced apart from each other.

Figure 18:
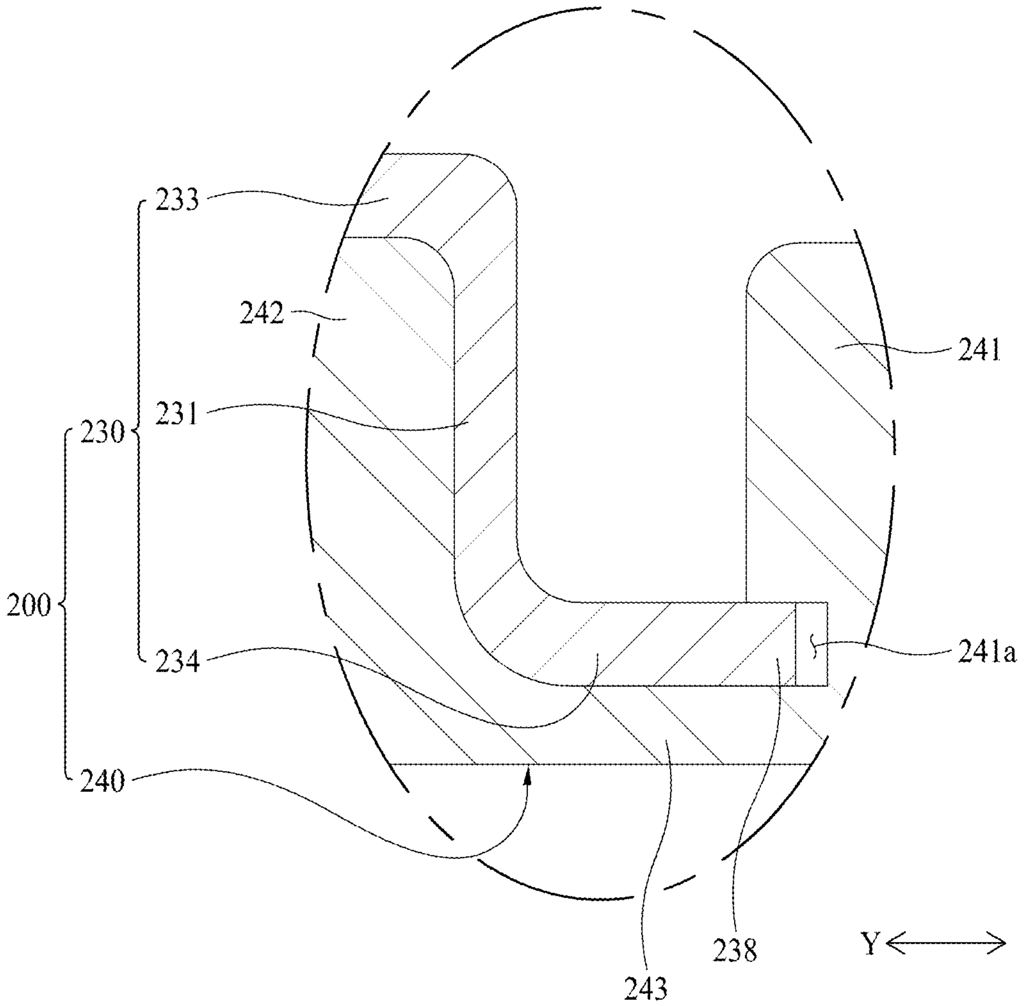
FIGS. 18 and 19 are schematic side-sectional views showing the enlarged portion A of FIG. 7 to illustrate a coupling relationship between the insulating part and the grounding housing of the board connector according to the first embodiment.

Next, as shown in FIG. 18, the insulating part 240 may include a catching groove 241*a*. The catching groove 241*a* may be formed in the insulating member 241. The catching groove 241*a* may be formed on a face of the insulating member 241 facing the insertion member 242. When the grounding housing 230 and the insulating part 240 are coupled, the grounding arm 238 may be inserted into the catching groove 241*a*. Thus, the insulating member 241 supports the grounding arm 238, and thus the grounding housing 230 and the insulating part 240 may be firmly coupled.

Although not shown, an elastic groove may be formed on the grounding floor 234. The elastic groove may be placed on both sides of the grounding arm 238. Due to the elastic groove, the elastically movable displacement of the grounding arm 238 may increase with respect to the grounding floor 234. The elastic groove may be formed to extend from the grounding floor 234 to the inner grounding wall 231. The grounding housing 230 may include a plurality of grounding arms 238. The grounding arms 238 may be disposed to protrude from the grounding floor 234 at positions spaced apart from each other. In this case, the insulating part 240 may include a plurality of catching grooves 241*a*. The catching grooves 241*a* may be formed in the insulating member 241 at positions spaced apart from each other.

Figure 19:
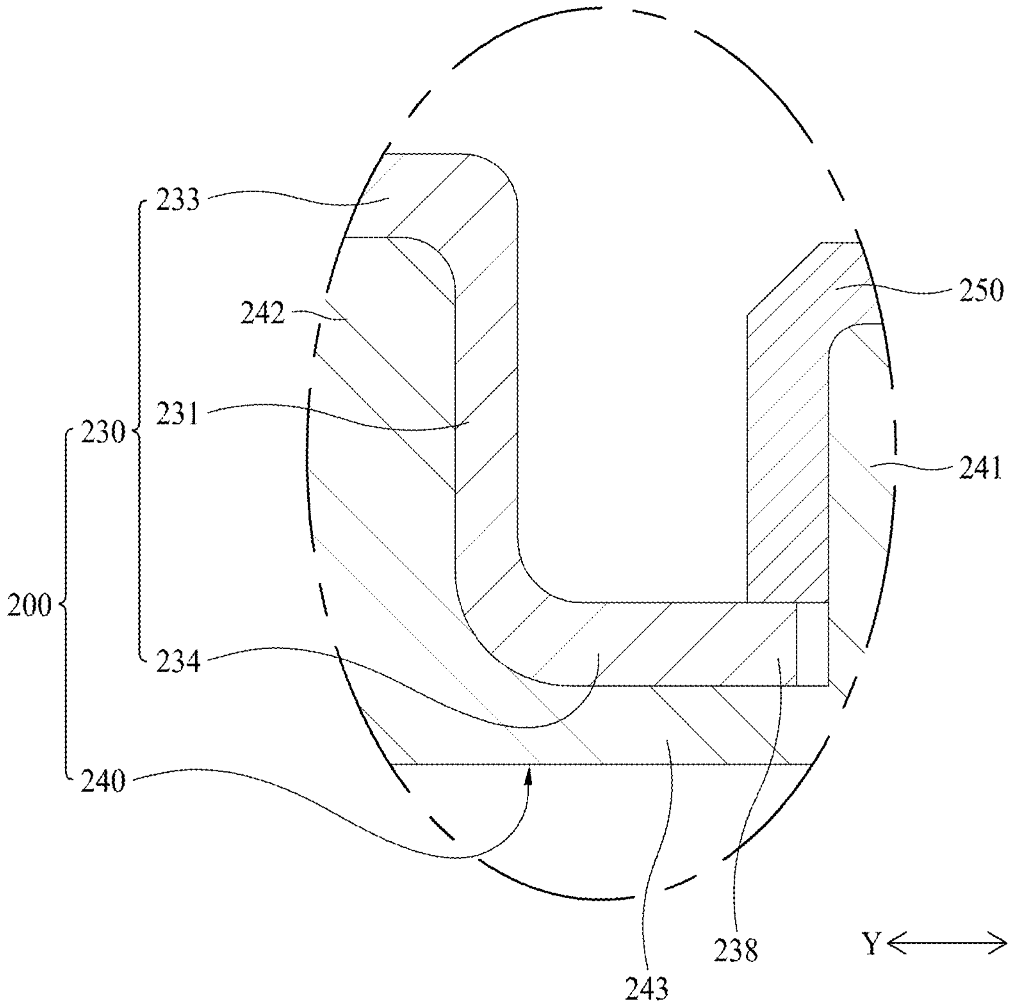

Next, as shown in FIG. 19, when the grounding housing 230 and the insulating part 240 are coupled, the grounding arm 238 may receive pressure from the first grounding contact 250. The first grounding contact 250 supports the grounding arm 238 while remaining coupled to the insulating part 240, and thus the grounding housing 230 and the insulating part 240 may be firmly coupled.

Although not shown, an elastic groove may be formed on the grounding floor 234. The elastic groove may be placed on both sides of the grounding arm 238. Due to the elastic groove, the elastically movable displacement of the grounding arm 238 may increase with respect to the grounding floor 234. The elastic groove may be formed to extend from the grounding floor 234 to the inner grounding wall 231. The grounding housing 230 may include a plurality of grounding arms 238. The grounding arms 238 may be disposed to protrude from the grounding floor 234 at positions spaced apart from each other. Some of the grounding arms 238 may receive pressure from the first grounding contact 250, and others of the grounding arms 238 may receive pressure from the second grounding contact 260 (see FIG. 14). The others of the grounding arms 238 may receive pressure from the transmission contact 220 (see FIG. 14).

Figure 20:
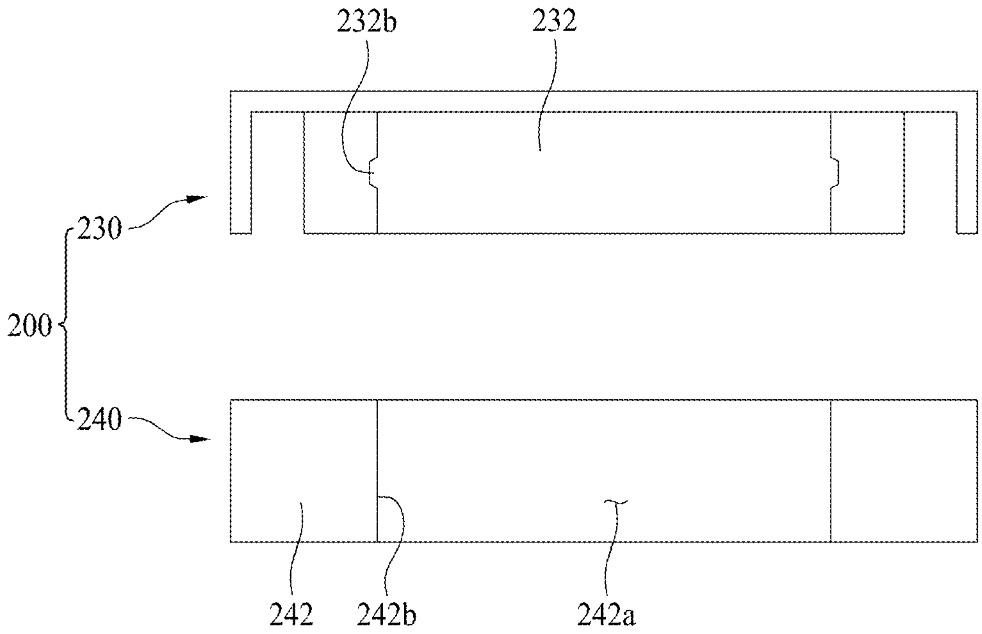
FIG. 20 is a schematic exploded side view of the insulating part and the grounding housing of the board connector according to the first embodiment.

As shown in FIG. 20, the insulating part 240 may include an insertion groove 242*a*. The insertion groove 242*a* may be formed in the insertion member 242. The insertion groove 242*a* may be implemented as a groove formed on the outer surface of the insertion member 242 to a certain depth. A catching surface 242*b* disposed toward the insertion groove 242*a* may be formed on the insertion member 242.

The grounding housing 230 may include a catching member 232*b*. The catching member 232*b* may be formed on the outer grounding wall 232. In this case, the grounding housing 230 may include a plurality of outer grounding walls 232 spaced apart from each other so that outer grounding wall 232 can be inserted into the insertion groove 242*a*. The catching member 232*b* may protrude from opposite sides of the outer grounding walls 232 facing each other. Thus, when the grounding housing 230 and the insulating part 240 are coupled, the catching member 232*b* may apply pressure on the catching surface 242*b*. In this case, the catching member 232*b* may be inserted into the catching surface 242*b* like a wedge. Accordingly, the grounding housing 230 and the insulating part 240 may be firmly coupled. Although not shown, the insulating part 240 may include a plurality of insertion grooves 242*a*. The insertion grooves 242*a* may be formed on the insertion member 242 at positions spaced apart from each other. In this case, the grounding housing 230 may include a plurality of outer grounding walls 232 where the catching member 232*b* is formed. The outer grounding walls 232 may be disposed at positions spaced apart from each other and inserted into the insertion grooves 242*a*.

Board Connector 300 According to Second Embodiment

Figure 21:
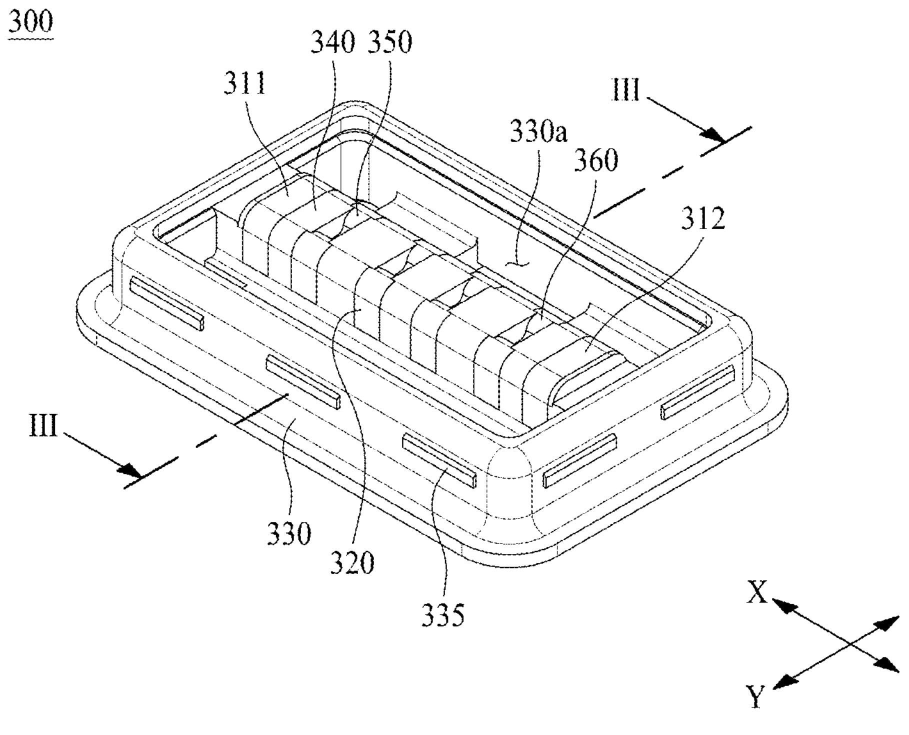
FIG. 21 is a schematic perspective view of the board connector according to the second embodiment.

Referring to FIGS. 2 and 21, the board connector 300 according to the second embodiment may include a plurality of RF contacts 310, a plurality of transmission contacts 320, a grounding housing 330, and an insulating part 340.

The RF contacts 310 are for transmitting RF signals. The RF contacts 310 may transmit ultra-high frequency RF signals. The RF contacts 310 may be supported by the insulating part 340. The RF contacts 310 may be coupled to the insulating part 340 through an assembly process. The RF contacts 310 may be integrally molded with the insulating part 340 through injection molding.

The RF contacts 310 may be spaced apart from one another. The RF contacts 310 may be electrically connected to the second board by being mounted on the second board. The RF contacts 310 may be electrically connected to the first board on which the receptacle connector is mounted, by being connected to the RF contacts of the receptacle connectors. Thus, the first board and the second board may be electrically connected to each other. In this case, the receptacle connector may be implemented as the board connector 200 according to the first embodiment. Meanwhile, the plug connector in the board connector 200 according to the first embodiment may be implemented as the board connector 300 according to the second embodiment.

Figure 22:
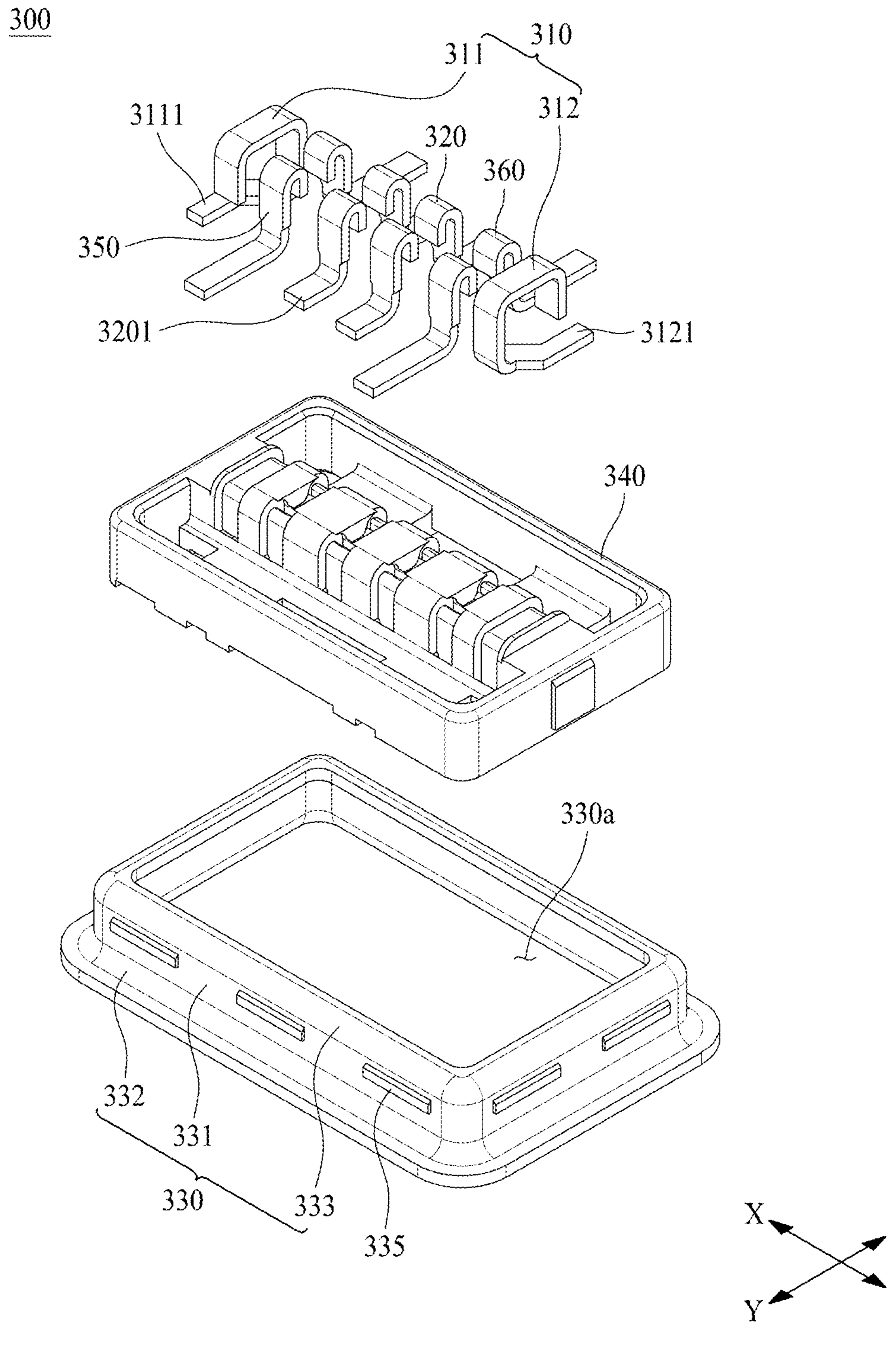
FIG. 22 is a schematic exploded perspective view of the board connector according to the second embodiment.

A first RF contact 311 among the RF contacts 310 and a second RF contact 312 among the RF contacts 310 may be spaced apart from each other in the first axial direction (x-axis direction). The first RF contact 311 and the second RF contact 312 may be supported by the insulating part 340 at positions spaced apart from each other in the first axial direction (x-axis direction). FIG. 22 shows that the board connector 300 according to the second embodiment includes two RF contacts 310. However, the present disclosure is not limited thereto, and the board connector 300 according to the second embodiment may include three or more RF contacts 310. Meanwhile, the board connector 300 according to the second embodiment will be described herein as including two RF contacts 310.

The first RF contact 311 may include a first RF mounting member 3111. The first RF mounting member 3111 may be mounted on the second board. Thus, the first RF contact 311 may be electrically connected to the second board through the first RF mounting member 3111. The first RF contact 311 may be formed of an electrically conductive material. For example, the first RF contact 311 may be formed of metal. The first RF contact 311 may be connected to one of the RF contacts of the receptacle connector.

The second RF contact 312 may include a second RF mounting member 3121. The second RF mounting member 3121 may be mounted on the second board. Thus, the second RF contact 312 may be electrically connected to the second board through the second RF mounting member 3121. The second RF contact 312 may be formed of an electrically conductive material. For example, the second RF contact 312 may be formed of metal. The second RF contact 312 may be connected to one of the RF contacts of the receptacle connector.

Referring to FIGS. 2, 21, and 22, the transmission contacts 320 are coupled to the insulating part 340. The transmission contacts 320 may be in charge of transmitting signals, data, etc. The transmission contacts 320 may be coupled to the insulating part 340 through an assembly process. The transmission contacts 320 may be integrally molded with the insulating part 340 through injection molding.

The transmission contacts 320 may be disposed between the first RF contact 311 and the second RF contact 312 in the first axial direction (x-axis direction). Thus, in order to reduce RF signal interference between the first RF contact 311 and the second RF contact 312, the transmission contacts 320 may be disposed in a space between the first RF contact 311 and the second RF contact 312. Accordingly, the board connector 300 according to the second embodiment can reduce RF signal interference by increasing the spacing between the first RF contact 311 and the second RF contact 312 and also can improve the space utilization of the insulating part 340 by arranging the transmission contacts 320 in the space.

The transmission contacts 320 may be spaced apart from each other. The transmission contacts 320 may be electrically connected to the second board by being mounted on the second board. In this case, a transmission mounting member 3201 of each of the transmission contacts 320 may be mounted on the second board. The transmission contacts 320 may be formed of an electrically conductive material. For example, the transmission contacts 320 may be formed of metal. The transmission contacts 320 may be electrically connected to the second board on which the receptacle connector is mounted, by being connected to the transmission contacts of the receptacle connector. Thus, the first board and the second board may be electrically connected to each other.

Meanwhile, in FIG. 22, it is shown that the board connector 300 according to the second embodiment includes four transmission contacts 320. However, the present disclosure is not limited thereto, and the board connector 300 according to the second embodiment may include five or more transmission contacts 320. The transmission contacts 320 may be spaced apart from each other in the first axial direction (x-axis direction) and the second axial direction (y-axis direction).

Referring to FIGS. 21 to 24, the insulating part 340 is coupled to the grounding housing 330. The grounding housing 330 may be grounded by being mounted on the second board. Thus, the grounding housing 330 may implement a shielding function of signals, electromagnetic waves, etc. for the RF contacts 310. In this case, the grounding housing 330 can prevent electromagnetic waves generated from the RF contacts 310 from interfering with signals of circuit components placed in the vicinity of the electronic device and can prevent electromagnetic waves generated from circuit components placed in the vicinity of the electronic device from interfering with RF signals transmitted by the RF contacts 310. Thus, the board connector 300 according to the second embodiment can contribute to improving EMI shielding performance and EMC performance by using the grounding housing 330. The grounding housing 330 may be formed of an electrically conductive material. For example, the grounding housing 330 may be formed of metal.

The grounding housing 330 may be disposed to surround the lateral sides of an inner space 330*a*. The insulating part 340 may be placed in the inner space 330*a*. The first RF contact 311, the second RF contact 312, and the transmission contacts 220 may all be placed in the inner space 330*a*. In this case, the first RF mounting member 3111, the second RF mounting member 3121, and the transmission mounting members 3201 may all be placed in the inner space 330*a*. Accordingly, by implementing shielding walls for the first RF contact 311 and the second RF contact 312, the grounding housing 330 can strengthen the shielding function for the first RF contact 311 and the second RF contact 312 to realize complete shielding. The receptacle connector may be inserted into the inner space 330*a*. In this case, a portion of the receptacle connector may be inserted into the inner space 330*a*, and a portion of the board connector 300 according to the second embodiment may be inserted into the inner space of the receptacle connector.

The grounding housing 330 may be disposed to surround all the sides of the inner space 330*a*. The inner space 330*a* may be disposed on an inner side of the grounding housing 330. When the grounding housing 330 is formed in a rectangular ring shape as a whole, the inner space 330*a* may be formed in a rectangular parallelepiped shape. In this case, the grounding housing 330 may be disposed to surround four sides of the inner space 330*a*.

Referring to FIGS. 21 to 25, the grounding housing 330 may include a side grounding wall 331, a lower grounding wall 332, and an upper grounding wall 333.

The side grounding wall 331 may be disposed to surround the lateral sides of the inner space 330*a*. The side grounding wall 331 may be disposed to surround all the sides of the inner space 330*a*. When the receptacle connector is inserted into the inner space 330*a*, the side grounding wall 331 may be connected to the grounding housing of the receptacle connector. In this case, the side grounding wall 331 may be connected to the inner grounding wall 231. The side grounding wall 331 may be formed in a vertically disposed plate shape.

The lower grounding wall 332 may protrude from the bottom of the side grounding wall 331 toward the opposite side to the inner space 330*a*. That is, the lower grounding wall 332 may protrude from the outside of the side grounding wall 331. The lower grounding wall 332 may be formed in a closed ring shape extending along the bottom of the side grounding wall 331. The lower grounding wall 332 may be grounded by being mounted on the second board. Thus, the side grounding wall 331 and the upper grounding wall 333 may be grounded through the lower grounding wall 332. That is, the grounding housing 330 may be grounded through the lower grounding wall 332. When the receptacle connector is inserted into the inner space 330*a*, the lower grounding wall 332 may be connected to the grounding housing of the receptacle connector. In this case, the lower grounding wall 332 may be connected to the grounding connection wall 233. The lower grounding wall 332 may be formed in a horizontally disposed plate shape.

The upper grounding wall 333 may protrude from the top of the side grounding wall 331 toward the inner space 330*a*. The upper grounding wall 333 may be formed in a closed ring shape extending along the top of the side grounding wall 331. When the receptacle connector is inserted into the inner space 330*a*, the upper grounding wall 333 may be connected to the grounding housing of the receptacle connector. In this case, the upper grounding wall 333 may be connected to the grounding floor 234. The upper grounding wall 333 may be formed in a horizontally disposed plate shape.

The upper grounding wall 333, the lower grounding wall 332, and the side grounding wall 331 may be integrally formed. In this case, the grounding housing 330 may be integrally formed without seams. The grounding housing 330 may be integrally formed without seams by a metal injection process such as metal die casting and metal injection molding (MIM). The grounding housing 330 may be integrally formed without seams through computer numerical control (CNC) processing, machining center tool (MCT) processing, or the like.

Referring to FIGS. 8 to 26, the grounding housing 330 may include the following configuration to further strengthen the shielding function by improving the contact between the side grounding wall 331 and the grounding housing of the receptacle connector.

First, as shown in FIG. 8, the grounding housing 330 may include a connection protrusion 335. The connection protrusion 335 may be formed on an outer surface of the side grounding wall 331. The connection protrusion 335 may protrude from the outer surface of the side grounding wall 331. The connection protrusion 335 may be inserted into the grounding housing 230 of the receptacle connector. In this case, the connection protrusion 335 may be inserted into the connection groove 235 of the grounding housing 230 of the receptacle connector. Thus, the board connector 300 according to the second embodiment can further strengthen the shielding function for the first RF contact 311 and the second RF contact 312 by using the connection protrusion 335 to improve the contact between the grounding housing 330 and the grounding housing 230 of the receptacle connector. In FIG. 8, it is shown that the connection protrusion 335 is formed to be a lesser length in the vertical direction than the connection groove 235. However, the present disclosure is not limited thereto, and the connection protrusion 335 and the connection groove 235 may be formed to be substantially the same length. The grounding housing 330 may include a plurality of connection protrusions 335. In this case, the connection protrusion 335 may be spaced apart from one another on the outer surface of the side grounding wall 331.

Next, as shown in FIG. 9, the grounding housing 330 may include a connection groove 334. The connection groove 334 may be formed on an outer surface of the side grounding wall 331. The connection groove 334 may be implemented as a groove formed on the outer surface of the side grounding wall 331 to a predetermined depth. A grounding housing 230 of the receptacle connector may be inserted into the connection groove 334. In this case, a connection protrusion 236 of the grounding housing 230 of the receptacle connector may be inserted into the connection groove 334. Thus, the board connector 300 according to the second embodiment can further strengthen the shielding function for the first RF contact 311 and the second RF contact 312 by using the connection groove 334 to improve the contact between the grounding housing 330 and the grounding housing 230 of the receptacle connector. In FIG. 9, it is shown that the connection groove 334 is formed to be a greater length in the vertical direction than the connection protrusion 236. However, the present disclosure is not limited thereto, and the connection groove 334 and the connection protrusion 236 may be formed to be substantially the same length. Meanwhile, the side grounding wall 331 may prevent the connection protrusion 236 from falling out of the connection groove 334 by supporting the connection protrusion 236 inserted into the connection groove 334. The grounding housing 330 may include a plurality of connection grooves 334. In this case, the connection grooves 334 may be spaced apart from one another on the outer surface of the side grounding wall 331.

Next, as shown in FIG. 10, when the grounding housing 330 includes the connection protrusion 335, the connection protrusion 335 may be supported by the connection protrusion 236 of the grounding housing 230 of the receptacle connector. Thus, the board connector 300 according to the second embodiment can further strengthen the shielding function for the first RF contact 311 and the second RF contact 312 by using the connection protrusion 335 to improve the contact between the grounding housing 330 and the grounding housing 230 of the receptacle connector. Meanwhile, the connection protrusion 335 may be placed on the bottom of the connection protrusion 236 and supported by the connection protrusion 236.

Figure 26:
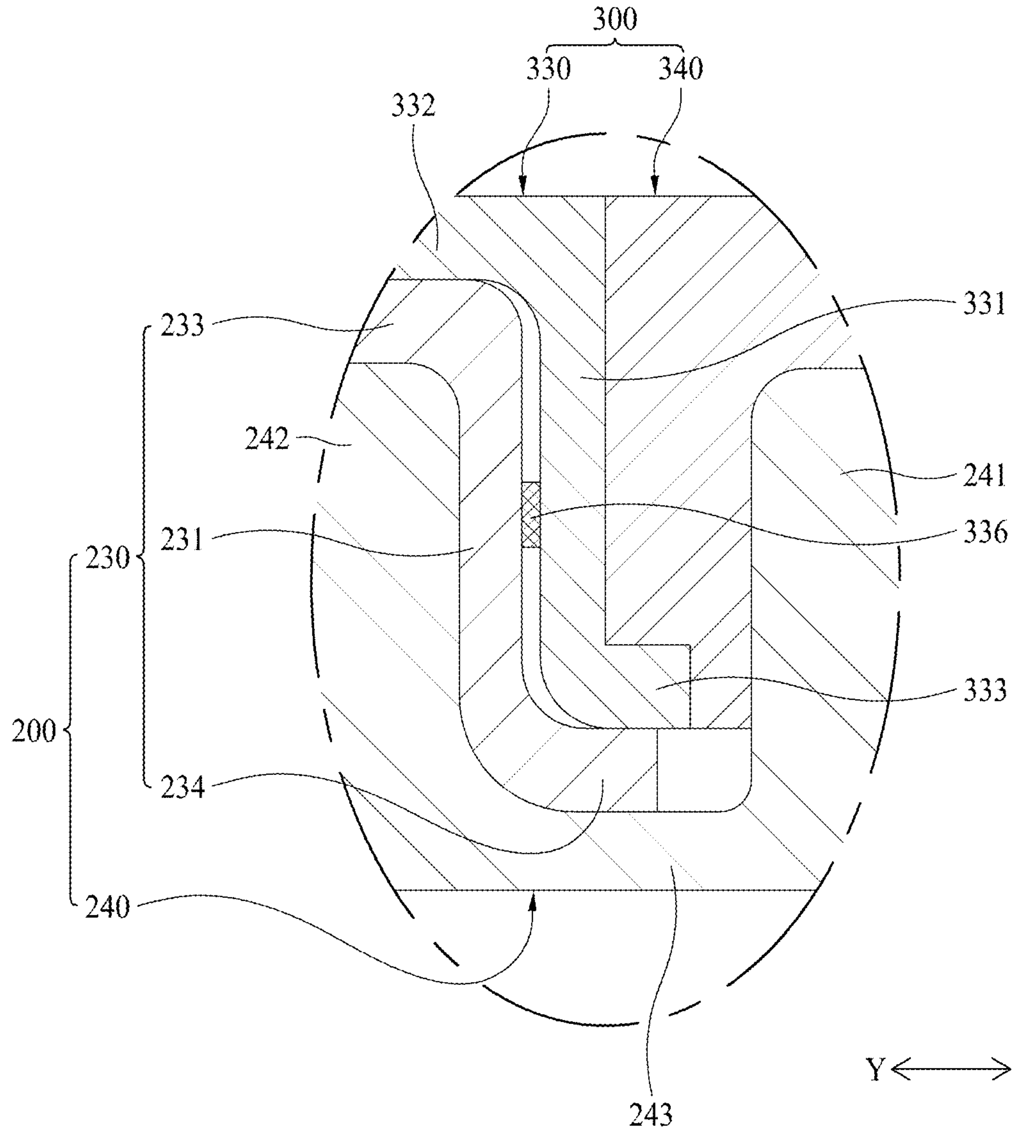
FIG. 26 is a schematic side-sectional view showing the enlarged portion A of FIG. 7 in an aspect in which the board connector according to the first embodiment and the board connector according to the second embodiment are coupled.

Next, as shown in FIG. 11, the grounding housing 330 may be brought into contact with the grounding housing 230 of the receptacle connector through the surface contact between the outer surface of the side grounding wall 331 and the grounding housing 230 of the receptacle connector. In this case, a gap may occur between the outer surface of the side grounding wall 331 and the grounding housing 230 of the receptacle connector. In order to compensate for the gap, as shown in FIG. 26, the grounding housing 330 may include a conductive member 336. The conductive member 336 may be coupled to the outer surface of the side grounding wall 331. The conductive member 336 may be formed in a closed ring shape that extends on the outer surface of the side grounding wall 331 including a corner portion 3301 (see FIG. 24) of the outer surface of the side grounding wall 331. Thus, the board connector 300 according to the second embodiment can further strengthen the shielding function for the first RF contact 311 and the second RF contact 312 by using the conductive member 336 to improve the contact between the grounding housing 330 and the grounding housing 230 of the receptacle connector. Also, implementation is difficult in the corner portion 3301 of the outer surface of the side grounding wall 331 in the embodiment using the connection protrusion 335 and the connection groove 334. On the other hand, it is possible to improve the easiness of the implementation in the corner portion 3301 of the outer surface of the side grounding wall 331 in the embodiment using the conductive member 336. The conductive member 336 may be formed of an electrically conductive material to electrically connect the side grounding wall 331 and the grounding housing 230 of the receptacle connector. For example, the conductive member 336 may be formed of metal. The conductive member 336 may be separately produced and then coupled to the side grounding wall 331 through mounting, attachment, and fastening to the outer surface of the side grounding wall 331. The conductive member 336 may be coupled to the side grounding wall 331 by applying a conductive shielding material to the outer surface of the side grounding wall 331.

Referring to FIGS. 13 to 26, the grounding housing 330 may include a grounding plate 337 (see FIG. 13).

The grounding plate 337 may protrude from the upper grounding wall 333 to the inner space 330*a*. When the receptacle connector is inserted into the inner space 330*a*, the grounding plate 337 may apply pressure on the grounding housing 230 of the receptacle connector. In this case, the grounding plate 337 may rotate and move the grounding arm 238 downward by applying pressure on the grounding arm 238 of the grounding housing 230. Thus, the grounding arm 238 applys pressure to the grounding plate 337 using a restoring force and thus comes into strong contact with the grounding plate 337. Accordingly, the board connector 300 according to the second embodiment can further strengthen the shielding function for the first RF contact 311 and the second RF contact 312 by using the grounding plate 337 to improve the contact between the grounding housing 330 and the grounding housing 230 of the receptacle connector. The grounding housing 330 may include a plurality of grounding plates 337. In this case, the grounding plates 337 may be spaced apart from one another along the upper grounding wall 333.

Referring to FIGS. 21 to 26, the insulating part 340 may support the RF contacts 310. The RF contacts 310 and the transmission contacts 320 may be coupled to the insulating part 340. The insulating part 340 may be formed of an insulating material. The insulating part 340 may be coupled to the grounding housing 330 so that the RF contacts 310 are placed in the inner space 330*a*. The insulating part 340 may be coupled to the grounding housing 330 through interference fitting.

Figure 23:
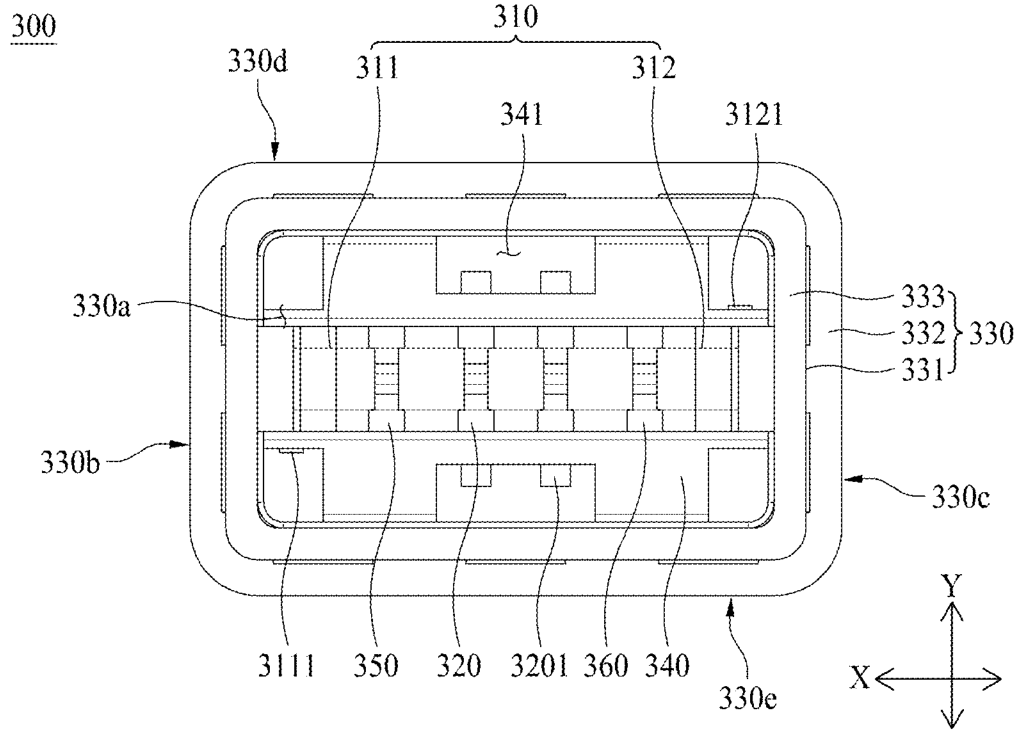
FIG. 23 is a schematic plan view of the board connector according to the second embodiment.
Figure 24:
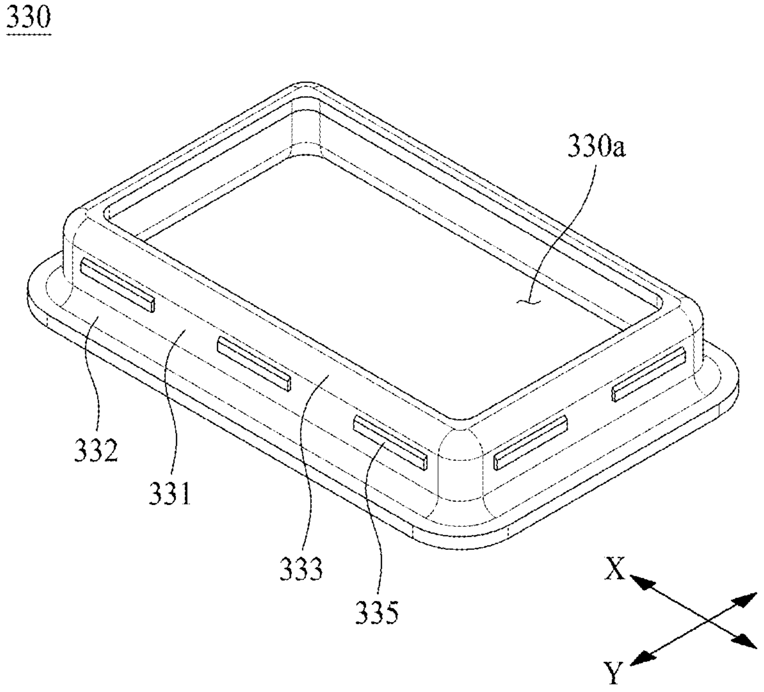
FIG. 24 is a schematic perspective view of the grounding housing of the board connector according to the second embodiment.
Figure 25:
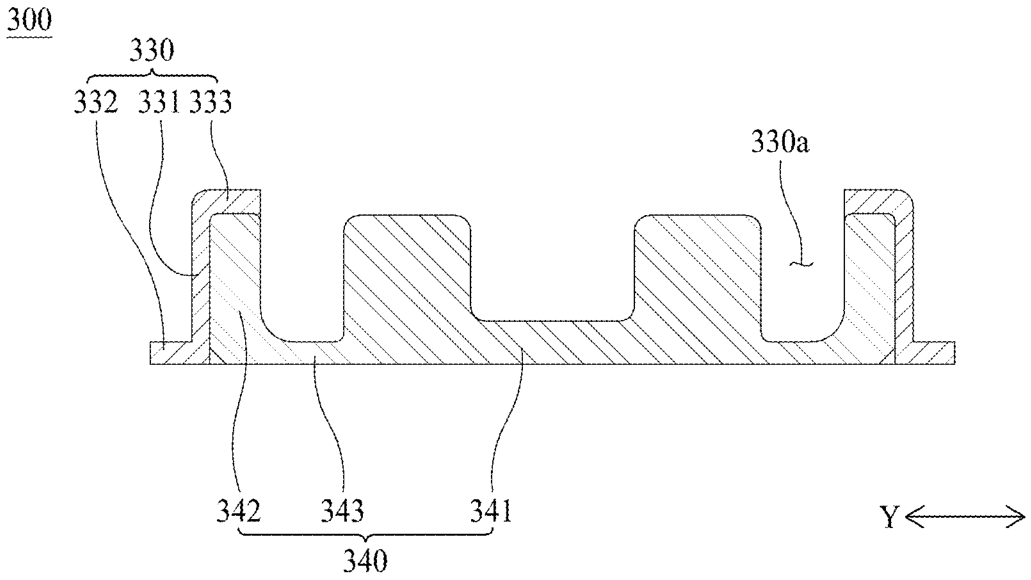
FIG. 25 is a schematic side-sectional view taken along line of FIG. 21.

The insulating part 340 may include a soldering inspection window 341 (see FIG. 23).

The soldering inspection window 341 may be formed through the insulating part 340. The soldering inspection window 341 may be used to inspect a state in which the first RF mounting member 3111 is mounted on the second board. In this case, the first RF contact 311 may be coupled to the insulating part 340 such that the first RF mounting member 3111 is placed at the soldering inspection window 341. Thus, the first RF mounting member 3111 is not covered by the insulating part 340. Accordingly, while the board connector 300 according to the second embodiment is mounted on the second board, it is possible for a worker to inspect a state in which the first RF mounting member 3111 is mounted on the second board through the soldering inspection window 341. Thus, the board connector 300 according to the second embodiment can improve the accuracy of a mounting operation for mounting the first RF contact 311 on the second board even if the entirety of the first RF contact 311 including the first RF mounting member 3111 is placed on the inner side of the grounding housing 330. The soldering inspection window 341 may be formed through the insulating member 241.

The insulating part 340 may include a plurality of soldering inspection windows 341. In this case, the second RF mounting member 3121 and the transmission mounting members 3201 may be placed at the soldering inspection windows 341. Accordingly, while the board connector 300 according to the second embodiment is mounted on the second board, it is possible for a worker to inspect a state in which the first RF mounting member 3111, the second RF mounting member 3121, and the transmission mounting members 3201 are mounted on the second board through the soldering inspection windows 341. Thus, the board connector 300 according to the second embodiment can improve the accuracy of the operation of mounting the first RF contact 311, the second RF contact 312, and the transmission contacts 320 on the second board.

Referring to FIGS. 21 to 27, the board connector 300 according to the second embodiment may include a first grounding contact 350.

The first grounding contact 350 is coupled to the insulating part 340. The first grounding contact 350 may be grounded by being mounted on the second board. The first grounding contact 350 may be coupled to the insulating part 340 through an assembly process. The first grounding contact 350 may be integrally molded with the insulating part 340 through injection molding.

Figure 27:
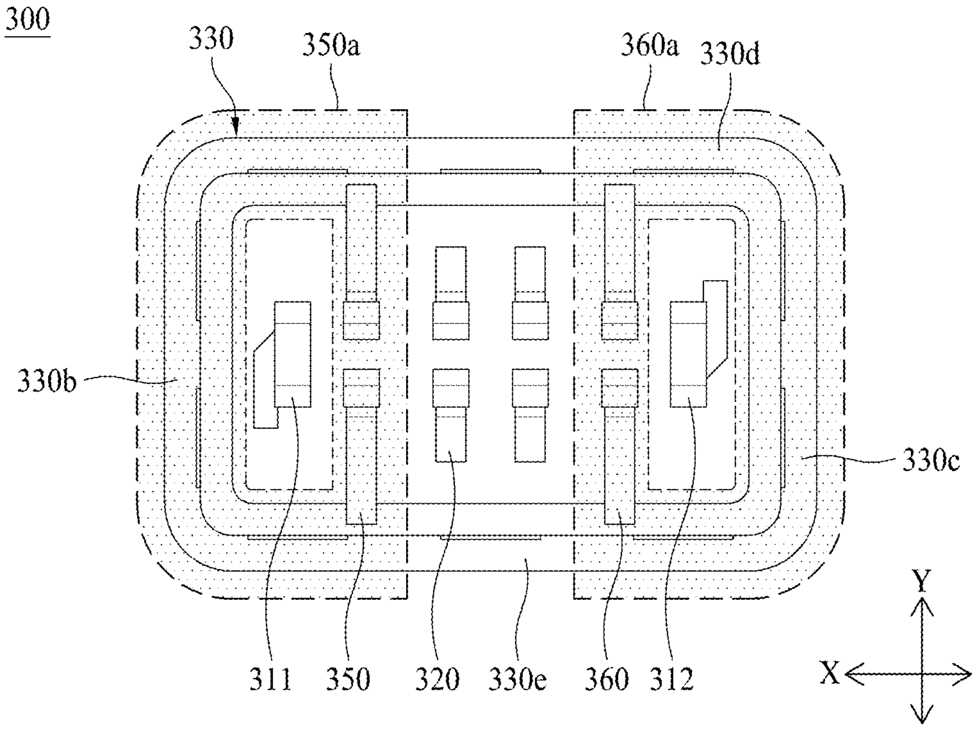
FIG. 27 is a schematic plan view illustrating a grounding loop in the board connector according to the second embodiment.

The first grounding contact 350 may implement the shielding function for the first RF contact 311 together with the grounding housing 330. In this case, as shown in FIGS. 23 and 27, the grounding housing 330 may include a first shielding wall 330*b*, a second shielding wall 330*c*, a third shielding wall 330*d*, and a fourth shielding wall 330*e*. The first shielding wall 330*b*, the second shielding wall 330*c*, the third shielding wall 330*d*, and the fourth shielding wall 330*e* may be implemented by the side grounding wall 331, the lower grounding wall 332, and the upper grounding wall 333. The first shielding wall 330*b* and the second shielding wall 330*c* may be disposed to face each other in the first axial direction (x-axis direction). The first RF contact 311 may be placed between the first shielding wall 330*b* and the second shielding wall 330*c* in the first axial direction (x-axis direction). The first RF contact 311 may be placed at a position where the spacing from the first shielding wall 330*b* is shorter than the spacing from the second shielding wall 330*c* in the first axial direction (X-axis direction). The third shielding wall 330*d* and the fourth shielding wall 330*e* may be disposed to face each other in the second axial direction (y-axis direction). The first RF contact 311 may be placed between the third shielding wall 330*d* and the fourth shielding wall 330*e* in the second axial direction (y-axis direction). The first RF contact 311 may be spaced an approximately equal distance from each of the third shielding wall 330*d* and the fourth shielding wall 330*e* in the second axial direction (y-axis direction).

The first grounding contact 350 may be disposed between the first RF contact 311 and the transmission contacts 320 in the first axial direction (x-axis direction). Accordingly, the first RF contact 311 may be placed between the first shielding wall 330*b* and the first grounding contact 350 in the first axial direction (x-axis direction) and may be placed between the third shielding wall 330*d* and the fourth shielding wall 330*e* in the second axial direction (y-axis direction). Accordingly, the board connector 300 according to the second embodiment can strengthen the shielding function for the first RF contact 311 using the first grounding contact 350, the first shielding wall 330*b*, the third shielding wall 330*d*, and the fourth shielding wall 330*e*.

The first grounding contact 350, the first shielding wall 330*b*, the third shielding wall 330*d*, and the fourth shielding wall 330*e* may be disposed at four corners with respect to the first RF contact 311 to implement shielding against RF signals. In this case, the first grounding contact 350, the first shielding wall 330*b*, the third shielding wall 330*d*, and the fourth shielding wall 330*e* may implement a grounding loop 350*a* (see FIG. 27) for the first RF contact 311. Accordingly, the board connector 300 according to the second embodiment can realize complete shielding for the first RF contact 311 by further strengthening the shielding function for the first RF contact 311 using the grounding loop 350*a*.

The first grounding contact 350 may be formed of an electrically conductive material. For example, the first grounding contact 350 may be formed of metal. When the receptacle connector is inserted into the inner space 330*a*, the first grounding contact 350 may be connected to the grounding contact of the receptacle connector.

The board connector 300 according to the second embodiment may include a plurality of first grounding contacts 350. The first grounding contacts 350 may be spaced apart from each other in the second axial direction (y-axis direction). A gap formed by the first grounding contacts 350 being spaced apart from each other may be filled in when the first grounding contact 350 is connected to the grounding contact of the receptacle connector.

Referring to FIGS. 21 to 27, the board connector 300 according to the second embodiment may include a second grounding contact 360.

The second grounding contact 360 is coupled to the insulating part 340. The second grounding contact 360 may be grounded by being mounted on the second board. The second grounding contact 360 may be coupled to the insulating part 340 through an assembly process. The second grounding contact 360 may be integrally molded with the insulating part 340 through injection molding.

The second grounding contact 360 may implement the shielding function for the second RF contact 312 together with the grounding housing 330. The second grounding contact 360 may be disposed between the second RF contact 312 and the transmission contacts 320 in the first axial direction (x-axis direction). Accordingly, the second RF contact 312 may be placed between the second shielding wall 330*c* and the second grounding contact 360 in the first axial direction (x-axis direction) and may be placed between the third shielding wall 330*d* and the fourth shielding wall 330*e* in the second axial direction (y-axis direction). Accordingly, the board connector 300 according to the second embodiment can strengthen the shielding function for the second RF contact 312 using the second grounding contact 360, the second shielding wall 330*c*, the third shielding wall 330*d*, and the fourth shielding wall 330*e*.

The second grounding contact 360, the second shielding wall 330*c*, the third shielding wall 330*d*, and the fourth shielding wall 330*e* may be disposed at four corners with respect to the second RF contact 312 to implement shielding against RF signals. In this case, the second grounding contact 360, the second shielding wall 330*c*, the third shielding wall 330*d*, and the fourth shielding wall 330*e* may implement a grounding loop 360*a* (see FIG. 27) for the second RF contact 312. Accordingly, the board connector 300 according to the second embodiment can realize complete shielding for the second RF contact 312 by further strengthening the shielding function for the second RF contact 312 using the grounding loop 360*a*.

The second grounding contact 360 may be formed of an electrically conductive material. For example, the second grounding contact 360 may be formed of metal. When the receptacle connector is inserted into the inner space 330*a*, the second grounding contact 360 may be connected to the grounding contact of the receptacle connector.

The board connector 300 according to the second embodiment may include a plurality of second grounding contacts 360. The second grounding contacts 360 may be spaced apart from each other in the second axial direction (y-axis direction). A gap formed by the second grounding contacts 360 being spaced apart from each other may be filled in when the second grounding contact 360 is connected to the grounding contact of the receptacle connector.

The present disclosure described above is not limited to the above-described embodiments and the accompanying drawings, and it will be obvious to those skilled in the art that various substitutions, modifications, and changes can be made without departing from the technical spirit of the present disclosure.

The invention claimed is:

1. A board connector comprising:

a plurality of radio frequency (RF) contacts for transmitting RF signals;

an insulating part that supports the RF contacts;

a plurality of transmission contacts coupled to the insulating part and between a first RF contact and a second RF contact, among the RF contacts, such that the first RF contact and the second RF contact are spaced apart from each other in a first axial direction; and a grounding housing to which the insulating part is coupled, the grounding housing comprising an inner grounding wall facing the insulating part, an outer grounding wall spaced apart from the inner grounding wall, and a grounding connection wall coupled to each of the inner grounding wall and the outer grounding wall, wherein the inner grounding wall and the outer grounding wall are double-shielding walls that surround the lateral sides of an inner space, and the first RF contact and the second RF contact are placed in the inner space surrounded by the double-shielding walls.

2. The board connector of claim 1, wherein the grounding housing comprises a grounding floor protruding from the inner grounding wall to the inner space, the insulating part comprises an insulating member that supports the RF contacts and the transmission contacts, and the grounding floor is placed between the inner grounding wall and the insulating member.

3. The board connector of claim 1, wherein the grounding housing is integrally formed without seams.

4. The board connector of claim 1, further comprising a first grounding contact coupled to the insulating part and between the first RF contact and the transmission contacts, wherein the grounding housing comprises a first double-shielding wall and a second double-shielding wall disposed to face each other in the first axial direction and a third double-shielding wall and a fourth double-shielding wall disposed to face each other in a second axial direction perpendicular to the first axial direction, and the first RF contact is placed between the first double-shielding wall and the first grounding contact in the first axial direction and is placed between the third double-shielding wall and the fourth double-shielding wall in the second axial direction.

5. The board connector of claim 1, wherein the grounding housing comprises a connection groove formed on an inner surface of the inner grounding wall.

6. The board connector of claim 1, wherein the grounding housing comprises a connection protrusion that protrudes from an inner surface of the inner grounding wall.

7. The board connector of claim 1, wherein the grounding housing comprises a conductive member coupled to an inner surface of the inner grounding wall, and the conductive member is formed in a closed ring shape that extends on the inner surface of the inner grounding wall including a corner portion of the inner surface of the inner grounding wall.

8. The board connector of claim 1, wherein the grounding housing comprises a grounding floor protruding from the inner grounding wall to the inner space and a grounding arm protruding from the grounding floor to the inner space, and the grounding arm is inclined to increase in height as the grounding arm protrudes toward the inner space.

9. The board connector of claim 1, wherein the first RF contact comprises a first RF mounting member for mounting on a board, and the first RF mounting member is coupled to the insulating part so as to be placed on a soldering inspection window formed through the insulating part.

10. The board connector of claim 1, wherein the first RF contact comprises a first RF mounting member for mounting on a board, and the first RF mounting member is coupled to the insulating part so as to be placed on a position corresponding to a soldering inspection window formed through the grounding housing.

11. The board connector of claim 1, wherein the grounding housing comprises a grounding floor protruding from the inner grounding wall to the inner space, and the grounding floor is connected to a grounding housing of a plug connector to be inserted into the inner space and is connected to an upper grounding wall of the grounding housing of the plug connector.

12. The board connector of claim 1, wherein the outer grounding wall is mounted on a board, and the grounding housing is grounded through the outer grounding wall mounted on the board.

13. A board connector comprising:

a plurality of radio frequency (RF) contacts for transmitting RF signals;

an insulating part that supports the RF contacts;

a plurality of transmission contacts coupled to the insulating part and between a first RF contact and a second RF contact, among the RF contacts, such that the first RF contact and the second RF contact are spaced apart from each other in a first axial direction; and a grounding housing to which the insulating part is coupled, the grounding housing comprising an inner grounding wall surrounding the side of an inner space, an upper grounding wall protruding from the top of the side grounding wall to the inner space, and a lower grounding wall protruding from the bottom of the side grounding wall to the opposite side to the inner space, wherein the first RF contact and the second RF contact are placed in an inner space surrounded by the side grounding wall, the upper grounding wall, and the lower grounding wall.

14. The board connector of claim 13, wherein the grounding housing is integrally formed without seams.

15. The board connector of claim 13, further comprising a first grounding contact coupled to the insulation part and between the first RF contact and the transmission contacts, wherein the grounding housing comprises a first shielding wall and a second shielding wall disposed to face each other in the first axial direction and a third shielding wall and a fourth shielding wall disposed to face each other in a second axial direction perpendicular to the first axial direction, and the first RF contact is placed between the first shielding wall and the first grounding contact in the first axial direction and is placed between the third shielding wall and the fourth shielding wall in the second axial direction.

16. The board connector of claim 13, wherein the grounding housing comprises a connection groove formed on an outer surface of the side grounding wall.

17. The board connector of claim 13, wherein the grounding housing comprises a connection protrusion that protrudes from an outer surface of the side grounding wall.

18. The board connector of claim 13, wherein the grounding housing comprises a conductive member coupled to an outer surface of the side grounding wall, and the conductive member is formed in a closed ring shape that extends on the outer surface of the inner grounding wall including a corner portion of the outer surface of the side grounding wall.

19. The board connector of claim 13, wherein the grounding housing comprises a grounding plate that protrudes from the upper grounding wall to the inner space.

20. The board connector of claim 13, wherein the first RF contact comprises a first RF mounting member for mounting on a board, and the first RF mounting member is coupled to the insulation part so as to be placed on a soldering inspection window formed through the insulation part.

* * * * *